(12) United States Patent
Hamaoka et al.

(10) Patent No.: US 10,826,620 B2
(45) Date of Patent: Nov. 3, 2020

(54) OPTICAL RECEIVER, OPTICAL RECEPTION METHOD, AND OPTICAL COMMUNICATION SYSTEM

(71) Applicant: NIPPON TELEGRAPH AND TELEPHONE CORPORATION, Tokyo (JP)

(72) Inventors: Fukutaro Hamaoka, Tokyo (JP); Seiji Okamoto, Yokosuka (JP); Masanori Nakamura, Yokosuka (JP); Kengo Horikoshi, Yokosuka (JP); Yoshiaki Kisaka, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/342,909

(22) PCT Filed: Oct. 25, 2017

(86) PCT No.: PCT/JP2017/038504
§ 371 (c)(1),
(2) Date: Apr. 17, 2019

(87) PCT Pub. No.: WO2018/079598
PCT Pub. Date: May 3, 2018

(65) Prior Publication Data
US 2020/0052793 A1 Feb. 13, 2020

(30) Foreign Application Priority Data

Oct. 28, 2016 (JP) .................. 2016-211793
Aug. 1, 2017 (JP) .................. 2017-149264

(51) Int. Cl.
*H04B 10/61* (2013.01)
*H04B 3/06* (2006.01)
*H04L 27/01* (2006.01)
*H04B 10/69* (2013.01)
*H04B 10/2507* (2013.01)
*H04L 25/03* (2006.01)

(52) U.S. Cl.
CPC ............. *H04B 10/613* (2013.01); *H04B 3/06* (2013.01); *H04B 10/6165* (2013.01);
(Continued)

(58) Field of Classification Search
CPC .... H04B 10/613; H04B 3/06; H04B 10/6165; H04B 1/38; H04B 10/60; H04B 10/61;
(Continued)

(56) References Cited

U.S. PATENT DOCUMENTS 5,495,203 A * 2/1996 Harp .................. H04L 25/03133
329/306
5,710,792 A * 1/1998 Fukawa ............ H04L 25/03273
375/229
(Continued)

FOREIGN PATENT DOCUMENTS

EP 2273703 A1 1/2011
JP 2015-005805 A 1/2015

OTHER PUBLICATIONS

E. Yamazaki et. al., "Fast optical channel recovery in field demonstration of 100-Gbit/s Ethernet over OTN using real-time DSP" Optics Express, vol. 19, No. 14, pp. 13179-13184 (2011).
(Continued)

*Primary Examiner* — Abbas H Alagheband
(74) *Attorney, Agent, or Firm* — Harness, Dickey & Pierce, P.L.C.

(57) ABSTRACT

An optical receiver that demodulates an optical modulation signal into a baseband signal, which is an electrical signal, and decodes a received symbol acquired by converting the baseband signal. The optical receiver includes: an analog-to-digital converter that converts the baseband signal into a digital signal of which the number of samples per received symbol is M/N (samples/symbol), M and N being positive integers, M/N being not an integer, and "M>N" being
(Continued)

satisfied; and an adaptive equalization processing unit that executes an equalization operation set in advance to output the received symbol on the basis of the digital signal of which the number of samples per received symbol is M/N (samples/symbol) and a predetermined tap coefficient digital signal equalization tap coefficients used for equalization of a signal, the coefficient being updated in any sampling period.

14 Claims, 18 Drawing Sheets

(52) U.S. Cl.
CPC .......... *H04L 27/01* (2013.01); *H04B 10/2507* (2013.01); *H04B 10/6166* (2013.01); *H04B 10/697* (2013.01); *H04L 25/03885* (2013.01)

(58) Field of Classification Search
CPC .. H04B 10/00; H04B 10/6166; H04B 10/697; H04B 10/2507; H04L 27/01; H04L 23/02; H04L 27/28; H04L 25/03; H04L 27/00; H04L 25/03133; H04L 25/03885; H04M 3/00
USPC ......................................................... 398/202
See application file for complete search history.

(56) References Cited

U.S. PATENT DOCUMENTS

| | | | |
|---|---|---|---|
| 5,809,009 A * | 9/1998 | Matsuoka | H03J 7/02 370/206 |
| 8,401,108 B1 * | 3/2013 | Haddadin | H03C 1/00 375/295 |
| 8,731,413 B1 * | 5/2014 | Dave | H04B 10/25137 398/202 |
| 9,025,963 B2 * | 5/2015 | Malouin | H04B 10/6166 398/140 |
| 9,755,757 B2 * | 9/2017 | Thesling | H04B 10/60 |
| 9,941,974 B2 * | 4/2018 | Yu | H04B 10/612 |
| 9,967,036 B2 * | 5/2018 | Malouin | H04B 10/6166 |
| 2010/0144333 A1 * | 6/2010 | Kiasaleh | H04B 1/406 455/418 |
| 2010/0296819 A1 | 11/2010 | Kahn et al. | |
| 2011/0236025 A1 | 9/2011 | Wagner et al. | |
| 2013/0108276 A1 * | 5/2013 | Kikuchi | H04B 10/697 398/158 |
| 2014/0341267 A1 * | 11/2014 | Ali Shah | H04L 25/03885 375/232 |
| 2014/0363173 A1 * | 12/2014 | Dave | H04L 7/0075 398/149 |
| 2015/0236795 A1 * | 8/2015 | Malouin | H04B 10/6166 398/65 |
| 2017/0257234 A1 * | 9/2017 | Ali Shah | H04L 25/03949 |

OTHER PUBLICATIONS

C. Malouin et. al., "Sub-Rate Sampling in 100 Gb/s Coherent Optical Receivers" OSA/OFC/NFOEC 2010, OThT3 (2010).
International Search Report (English and Japanese) and Written Opinion (in Japanese) issued in International Application No. PCT/JP2017/038504, dated Jan. 16, 2018; ISA/JP.
Extended European Search Report from counterpart EP178642443, dated Jul. 1, 2020.

* cited by examiner

OPTICAL RECEIVER, OPTICAL RECEPTION METHOD, AND OPTICAL COMMUNICATION SYSTEM

CROSS-REFERENCE TO RELATED APPLICATIONS

This application is a 371 U.S. National Stage of International Application No. PCT/JP2017/038504, filed on Oct. 25, 2017, which claims priority to Japanese Application Nos. 2016-211793, filed on Oct. 28, 2016 and 2017-149264, filed on Aug. 1, 2017. The entire disclosures of the above applications are incorporated herein by reference.

TECHNICAL FIELD

The present invention relates to an optical receiver, an optical reception method, and an optical communication system.

BACKGROUND ART

Recent optical communication systems performing optical transmission have used a digital coherent technology combining a coherent optical communication technology and a digital signal processing technology. FIG. 17 illustrates an example of an optical receiver 810 using a digital coherent technology. The optical receiver 810 includes an optical coherent receiving unit 811, an analog-to-digital converter (also referred to as an ADC) 812, and a digital signal processing unit 813. A polarization multiplexed optical modulation signal transmitted by an optical transmitter 850 is transmitted through an optical fiber transmission line 860 and is received by the optical receiver 810. The optical coherent receiving unit 811 of the optical receiver 810 includes a laser module and a photoelectric converter inside thereof. The optical coherent receiving unit 811 converts an optical signal acquired by causing the received polarization multiplexed optical modulation signal and local oscillation light output by the laser module to interfere with each other into an electrical signal using the photoelectric converter, and the electrical signal is demodulated into a baseband signal.

The analog-to-digital converter 812 converts a baseband signal output by the optical coherent receiving unit 811 into a digital signal and outputs the digital signal to the digital signal processing unit 813. The digital signal processing unit 813 includes a wavelength dispersion compensator 900, an adaptive equalizer 902, a carrier phase compensator 903, and a decoder 904. In the optical receiver 810 illustrated in FIG. 17, the analog-to-digital converter 812 generally converts a baseband signal output by the optical coherent receiving unit 811 into a digital signal such that the number of samples per symbol is L (samples/symbol), where L is a positive integer. The adaptive equalizer 902 performs equalization such that a digital signal output from the analog-to-digital converter 812 is a digital signal of "1" (samples/symbol). The digital signal processing unit 813 of the optical receiver 810 of the optical communication system 800 generally performs equalization by outputting a digital signal of "2" (samples/symbol) to the adaptive equalizer 902 from a point of view of operation speed and equalization of performance (for example, see Non-Patent Literature 1).

CITATION LIST

Non-Patent Literature

Non-Patent Literature 1
 E. Yamazaki et. al., "Fast optical channel recovery in field demonstration of 100-Gbit/s Ethernet over OTN using real-time DSP," OPTICS EXPRESS, Vol. 19, No. 14, pp. 13179-13184 (2011).
Non-Patent Literature 2
 C. Malouin et. al., "Sub-Rate Sampling in 100 Gb/s Coherent Optical Receivers," OSA/OFC/NFOEC 2010, OThT3 (2010).

SUMMARY OF INVENTION

Technical Problem

As in an optical communication system 800a illustrated in FIG. 18, there are cases in which an analog-to-digital converter 812 converts a baseband signal output by an optical coherent receiving unit 811 into a digital signal of which the number of samples per symbol is M (samples)/N (symbols) (hereinafter, referred to as M/N (samples/symbol)) to achieve a decrease in power consumption in an optical receiver 810a. Here, M and N are positive integers, and 1<M/N<2 is satisfied.

However, also in the optical receiver 810a illustrated in FIG. 18, it is necessary to include a sample rate converter 901 as a part in front of an adaptive equalizer 902 in order to output a digital signal of 2 (samples/symbol) to the adaptive equalizer 902. This sample rate converter 901 performs up-sampling of a digital signal having M/N (samples/symbol) into a digital signal of 2 (samples/symbol) and outputs the resultant digital signal to the adaptive equalizer 902 (for example, see Non-Patent Literature 2). Since the adaptive equalizer 902 equalizes a digital signal of 2 (samples/symbol) and outputs a digital signal of 1 (samples/symbol), consequently, there is a problem in that the power consumption cannot be decreased.

In consideration of the situations described above, an object of the present invention is to provide a technology enabling a decrease in power consumption in a reception-side process using an adaptive equalizer for a digital signal.

Solution to Problem

According to a first aspect of the present invention, there is provided an optical receiver that demodulates an optical modulation signal into a baseband signal, which is an electrical signal, and decodes a received symbol acquired by converting the baseband signal, the optical receiver including: an analog-to-digital converter that converts the baseband signal into a digital signal of which the number of samples per received symbol is M/N (samples/symbol), M and N being positive integers, M/N being not an integer, and "M>N" being satisfied; and an adaptive equalization processing unit that executes an equalization operation set in advance to output the received symbol on the basis of the digital signal of which the number of samples per received symbol is M/N (samples/symbol) and at least one tap coefficient used for equalization of a signal, the at least one tap coefficient being updated in any sampling period.

According to a second aspect of the present invention, in the optical receiver according to the first aspect, the at least one tap coefficient is updated every K×M sampling period, K being a positive integer.

According to a third aspect of the present invention, in the optical receiver according to the first or second aspect, the adaptive equalization processing unit includes: an adaptive equalizer that calculates an equalization signal of which the number of samples per symbol is M/N (samples/symbol) by executing the equalization operation on the basis of the digital signal of which the number of samples per received symbol is M/N (samples/symbol) and the at least one tap coefficient; and a sample rate converter that executes downsampling of the equalization signal of which the number of samples per received symbol is M/N (samples/symbol) to output the received symbol.

According to a fourth aspect of the present invention, in the optical receiver according to the first aspect, the at least one tap coefficient includes digital signal equalization tap coefficients, and the adaptive equalization processing unit includes an adaptive equalizer that calculates an equalization signal of 1 (samples/symbol) by executing the equalization operation on the basis of the digital signal of which the number of samples per received symbol is M/N (samples/symbol) and the digital signal equalization tap coefficients of N series and outputs the calculated equalization signal as the received symbol.

According to a fifth aspect of the present invention, in the optical receiver according to the first aspect, the at least one tap coefficient includes a digital signal equalization tap coefficient, and the adaptive equalization processing unit includes an adaptive equalizer that calculates an equalization signal of 1 (samples/symbol) by executing the equalization operation on the basis of the digital signal of which the number of samples per received symbol is M/N (samples/symbol), the digital signal equalization tap coefficient, and a phase shift tap coefficient of N series set in advance and outputs the calculated equalization signal as the received symbol.

According to a sixth aspect of the present invention, in the optical receiver according to the fifth aspect, the digital signal equalization tap coefficient is updated in any sampling period by executing a convolution operation of the phase shift tap coefficient and the digital signal.

According to a seventh aspect of the present invention, in the optical receiver according to the fifth aspect, the adaptive equalizer executes the equalization operation N times every M sampling periods to output the received symbol.

According to an eighth aspect of the present invention, in the optical receiver according to the seventh aspect, the adaptive equalizer calculates the equalization signal on the basis of the digital signal of which the number of samples per received symbol is M/N (samples/symbol) and the digital signal equalization tap coefficient without applying the phase shift tap coefficient in the equalization operation of a first time every M sampling periods and outputs the calculated equalization signal as the received symbol.

According to a ninth aspect of the present invention, there is provided an optical reception method of demodulating an optical modulation signal into a baseband signal, which is an electrical signal, and decoding a received symbol acquired by converting the baseband signal, the optical reception method including: converting the baseband signal into a digital signal of which the number of samples per received symbol is M/N (samples/symbol), M and N being positive integers, M/N being not an integer, and "M>N" being satisfied; and executing an equalization operation set in advance to output the received signal on the basis of the digital signal of which the number of samples per received symbol is M/N (samples/symbol) and at least one tap coefficient used for equalization of a signal, the at least one tap coefficient being updated in any sampling period.

According to a tenth aspect of the present invention, there is provided an optical communication system including: an optical transmitter that transmits an optical modulation signal; and an optical receiver that receives the optical modulation signal, demodulates the optical modulation signal into a baseband signal that is an electrical signal, and decoding a received symbol acquired by converting the baseband signal, in which the optical receiver includes: an analog-to-digital converter that converts the baseband signal into a digital signal of which the number of samples per received symbol is M/N (samples/symbol), M and N being positive integers, M/N being not an integer, and "M>N" being satisfied; and an adaptive equalization processing unit that executes an equalization operation set in advance to output the received symbol on the basis of the digital signal of which the number of samples per received symbol is M/N (samples/symbol) and at least one tap coefficient used for equalization of a signal, the at least one tap coefficient being updated in any sampling period.

Advantageous Effects of Invention

According to the present invention, power consumption in a process of a reception side using an adaptive equalizer for a digital signal can be decreased.

DESCRIPTION OF EMBODIMENTS

First Embodiment

Figure 1:
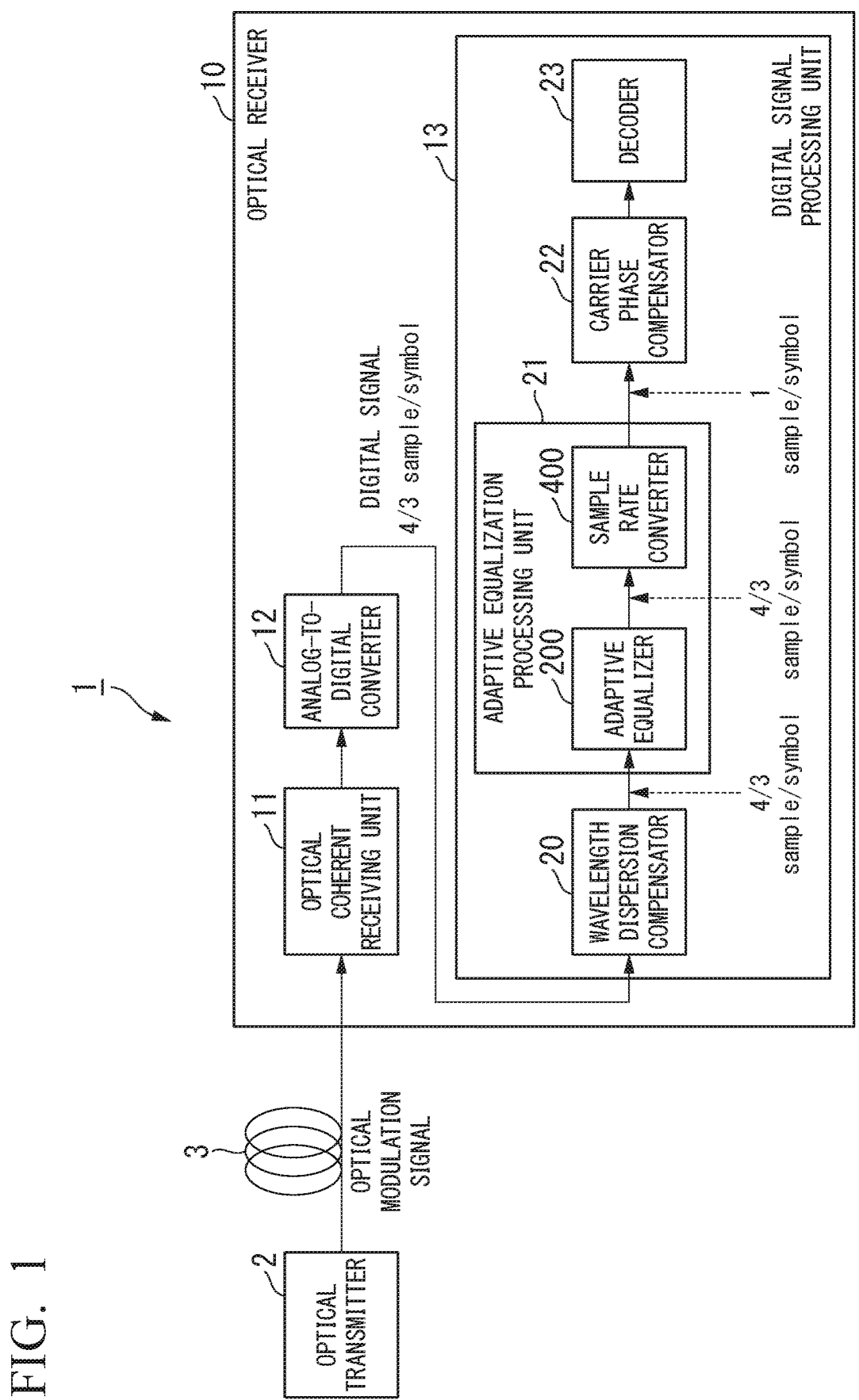
FIG. 1 is a diagram illustrating a configuration of an optical communication system according to a first embodiment.

Hereinafter, embodiments of the present invention will be described with reference to the drawings. FIG. 1 is a block diagram illustrating a configuration of an optical communication system 1 according to a first embodiment. The optical communication system 1 includes an optical transmitter 2, an optical fiber transmission line 3, and an optical receiver 10. The optical transmitter 2 modulates a transmission signal into an optical modulation signal by encoding the transmission signal and outputs the optical modulation signal to the optical fiber transmission line 3. The optical fiber transmission line 3 transmits the optical modulation signal output by the optical transmitter 2 to the optical receiver 10. The optical receiver 10 includes an optical coherent receiving unit 11, an analog-to-digital converter 12, and a digital signal processing unit 13.

The optical coherent receiving unit 11 of the optical receiver 10 demodulates an optical modulation signal into a baseband signal that is an electrical signal. The optical coherent receiving unit 11 includes a laser module and a photoelectric converter inside thereof. The optical coherent receiving unit 11 causes an optical modulation signal received through the optical fiber transmission line 3 and local oscillation light produced by the laser module to interfere with each other. The optical coherent receiving unit 11 converts an optical signal acquired by causing the optical modulation signal and the local oscillation light to interfere with each other into an electrical signal using the photoelectric converter and outputs the electrical signal as a baseband signal. The analog-to-digital converter 12 converts the baseband signal output by the optical coherent receiving unit 11 into a digital signal of which the number of samples per symbol is M/N (samples/symbol) and outputs the digital signal. In other words, the analog-to-digital converter 12 samples the baseband signal M times in a period in which N symbols are included in the baseband signal, thereby generating a digital signal of M/N (samples/symbol). Here, M and N are positive integers having values for which M/N is not an integer, and a relationship of M>N is satisfied. In the first embodiment, a case in which M=4 and N=3 will be described.

The digital signal processing unit 13 includes a wavelength dispersion compensator 20, an adaptive equalization processing unit 21, a carrier phase compensator 22, and a decoder 23. The wavelength dispersion compensator 20 compensates for a wavelength distortion according to wavelength dispersion for a digital signal output by the analog-to-digital converter 12. The adaptive equalization processing unit 21 includes an adaptive equalizer 200 and a sample rate converter 400. The adaptive equalizer 200 performs a predetermined equalization operation set in advance for a digital signal, of which the number of samples per symbol is 4/3 (samples/symbol), output by the wavelength dispersion compensator 20, thereby compensating for a wavelength distortion of the digital signal. The adaptive equalizer 200 outputs a digital signal of 4/3 (samples/symbol) for which a waveform distortion has been compensated. Here, the equalization operation set in advance, for example, is a convolution operation of applying equalization tap coefficients and a received digital signal output by the wavelength dispersion compensator 20.

The sample rate converter 400 performs down-sampling of a digital signal of 4/3 (samples/symbol) output by the adaptive equalizer 200 and outputs a digital signal of 1 (samples/symbol), in other words, a received symbol. The carrier phase compensator 22 compensates for a phase of the received symbol output from the sample rate converter 400. The carrier phase compensator 22 performs compensation for a difference in frequency between a laser produced by the laser module of the optical transmitter 2 and a laser produced by the laser module included in the optical coherent receiving unit 11 of the optical receiver 10 and compensation for phase noise according to a laser width of each laser module. The decoder 23 decodes the received symbol for which the phase has been compensated by the carrier phase compensator 22 and outputs a transmission signal.

Figure 2:
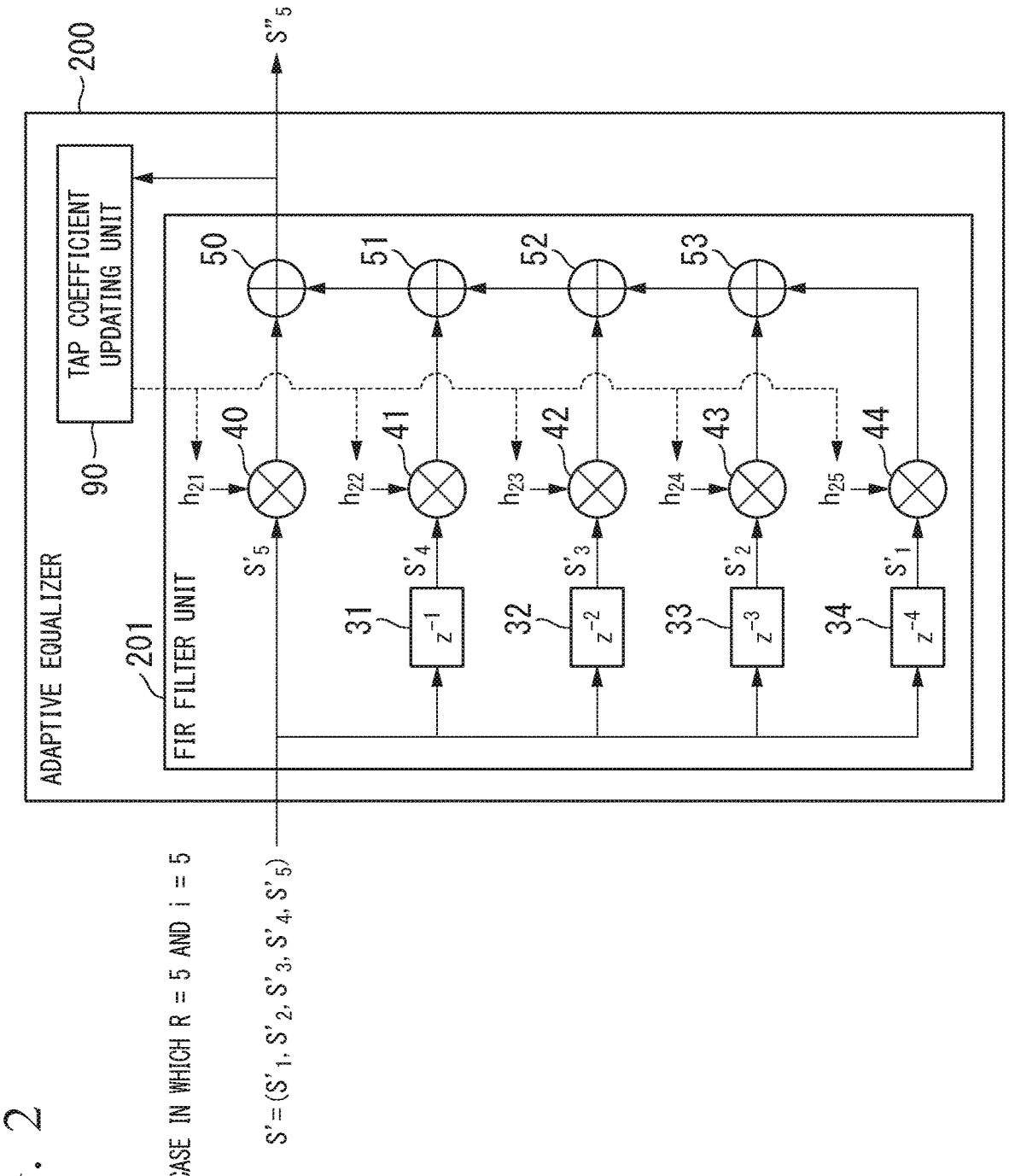
FIG. 2 is a diagram illustrating the configuration of an adaptive equalizer according to the first embodiment.

FIG. 2 is a block diagram illustrating the configuration of the adaptive equalizer 200. The adaptive equalizer 200, as described above, has a configuration for performing a convolution operation and includes a finite impulse response (FIR) filter unit 201 and a tap coefficient updating unit 90. The tap coefficient updating unit 90 outputs coefficients $h_{11}$, $h_{12}$, ..., $h_{1R}$, which are initial values of digital signal equalization tap coefficients set in advance, to be output to multipliers 40 to 44, respectively. Here, R is the number of taps and corresponds to the number of multipliers 40 to 44 included in the FIR filter unit 201. In the example illustrated in FIG. 2, R=5. In addition, the tap coefficient updating unit 90 performs an update operation set in advance once every K×M (here, K×4 where K is a positive integer) sampling periods on the basis of an equalization signal $S''_i$ output by the FIR filter unit 201 and outputs the updated digital signal equalization tap coefficients $h_{q1}$, $h_{q2}$, ... $h_{qR}$ obtained by the update operation. Here, the subscript q represents the number of times of updating tap coefficients. q=1 in the case of an initial value, and one is added thereto every time the tap coefficients are updated. FIG. 2 illustrates an example in which tap coefficients have been updated once (q=2).

Here, digital signal equalization tap coefficients $h_{q1}$, $h_{q2}$, ..., $h_{qR}$ can be represented as in Equation (1). In Equation (1), the left side denotes a digital signal equalization tap coefficient series vector $h_{qr}$, and the right side denotes a series formed from a plurality of digital signal equalization tap coefficients $h_{qr}$. In Equation (1), the digital signal equalization tap coefficient series vector $h_{qr}$ on the left side is denoted using thick letters representing a vector quantity. In the following description, in a case in which a vector quantity is represented, like the digital signal equalization tap coefficient series vector $h_{qr}$, the vector quantity will be described with letters of "vector" added thereto.

[Math. 1]

$$h_{qr} = (h_{q1}, h_{q2}, \ldots, h_{qR}) \tag{1}$$

In Equation (1), r is a tap number that is a positive integer starting from "1", and a maximum value thereof is R. In the example illustrated in FIG. 2, r=1 corresponds to the multiplier 40, r=2 corresponds to the multiplier 41, r=3 corresponds to the multiplier 42, r=4 corresponds to the multiplier 43, and r=5 corresponds to the multiplier 44. For example, $h_{23}$ output to the multiplier 42 illustrated in FIG. 2 has updated once by the tap coefficient updating unit 90 due to q=2 and r=3 and represents a digital signal equalization tap coefficient that is given to the multiplier 42 that is a third tap.

The FIR filter unit 201 includes delay units 31 to 34, multipliers 40 to 44, and adders 50 to 53. A series vector S' of a digital signal continuous to a time series represented in the following Equation (2) is output to the FIR filter unit 201. In addition, in order to distinguish a received digital signal series vector S' and each received digital signal S', the received digital signal series vector S' is denoted using thick letters representing a vector quantity in Equation (2).

[Math. 2]

$$S' = (S'_j, \ldots, S'_i) \quad (2)$$

In Equation (2), i is a positive integer representing an individual received digital signal in a time series of received digital signals starting from "1". j, similar to i, is a value representing a received individual digital signal and is a positive integer smaller than i. In Equation (2), in a case in which it is set such that j=i−R+1 using the tap number R=5, the right side of Equation (2) becomes $(S'_{i-4}, S'_{i-3}, S'_{i-2}, S'_{i-1}, S'_i)$. As illustrated in FIG. 2, in a case in which i=5, the right side of Equation (2) becomes $(S'_1, S'_2, S'_3, S'_4, S'_5)$.

The delay unit 31 outputs a digital signal delayed by $z^{-1}$, in other words, $S'_{i-1}$ that is delayed by one sample from $S'_i$ in a series of digital signals continuous in the time series. Similarly, the delay unit 32 outputs $S'_{i-2}$ delayed by $z^{-2}$, the delay unit 33 outputs $S'_{i-3}$ delayed by $z^{-3}$, and the delay unit 34 outputs $S'_{i-4}$ delayed by $z^{-4}$. FIG. 2 illustrates an example of the case of i=5, and the delay units 31 to 34 respectively output $S'_4, S'_3, S'_2,$ and $S'_1$. In addition, $S'_5$ is output to the multiplier 40 that is not connected to the delay units 31 to 34.

Each of the multipliers 40 to 44 calculates a product by multiplying a tap coefficient $h_{qr}$ that is an individual component of the digital signal equalization tap coefficient series vector $h_{qr}$ output from the tap coefficient updating unit 90 by a received digital signal $S'_i$ that is an individual component of the received digital signal series vector S'. The adders 50 to 53 add products calculated by the multipliers 40 to 44 and output an equalization signal $S''_i$. When the convolution operation executed by the FIR filter unit 201 is represented using a generalized numerical expression, the following Equation (3) is formed.

[Math. 3]

$$S'' = h_{qr} * S' \quad (3)$$

In Equation (3), S'' of the left side is an equalization signal series vector S'' acquired by executing a convolution operation. Here, the equalization signal series vector S'' contains equalization signals $S''_i$ as its components. A digital signal equalization tap coefficient series vector $h_{qr}$ of the right side and a received digital signal series vector S' respectively are represented in Equation (1) and Equation (2), and "*" is a convolution operator.

Figure 3:
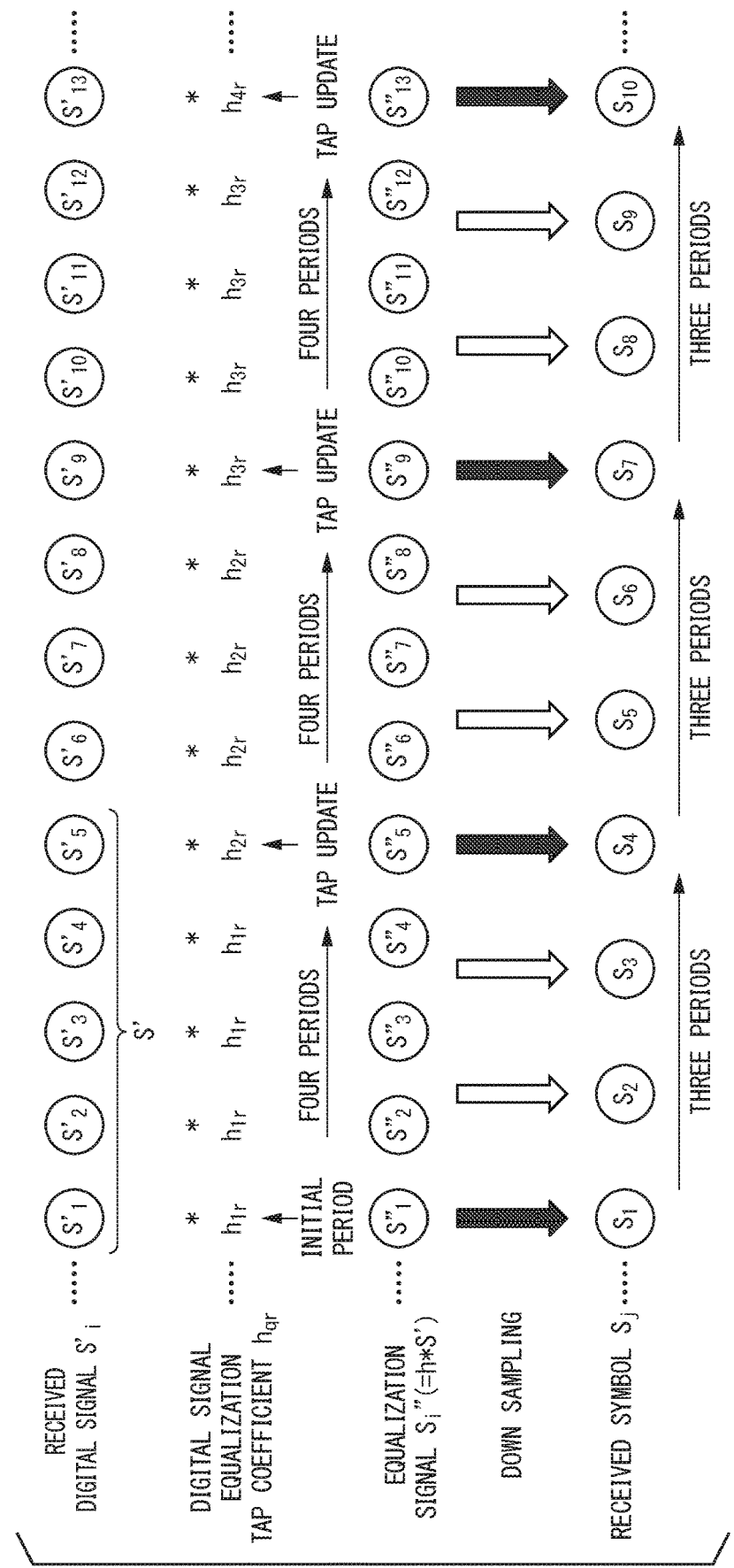
FIG. 3 is a diagram illustrating a process performed by an adaptive equalization processing unit according to the first embodiment.

Next, a process performed by the adaptive equalization processing unit 21 according to the first embodiment will be described with reference to FIGS. 2 and 3. FIG. 3 illustrates an example in which M=4, N=3, and R=5 (r=1, 2, ..., 5). A received digital signal $S'_i$ is a digital signal of 4/3 (samples/symbol). An equalization signal $S''_i$ ($=h_{rq}*S'$) is a signal with 4/3 (samples/symbol). A black arrow represents a case where an equalization signal and a received symbol coincide with each other. A white arrow represents a case where a received symbol is acquired by executing down sampling of an equalization signal from 4/3 (samples/symbol) to 1 (samples/symbol).

(Column of $S'_1$ Illustrated in FIG. 3 having Sampling Period i=1)

The tap coefficient updating unit 90 outputs a digital signal equalization tap coefficient series vector $h_{1r} = (h_{11}, h_{12}, h_{13}, h_{14}, h_{15})$ that are initial values to the multipliers 40 to 44. The wavelength dispersion compensator 20 outputs a received digital signal series vector $S' = (S'_{-3}, S'_{-2}, S'_{-1}, S'_0, S'_1)$ in the case of i=1. A digital signal $S'_1$ is output to the multiplier 40, and the received digital signal $S'_0, S'_{-1}, S'_{-2}, S'_{-3}$ are respectively output to the multipliers 41 to 44 through the delay units 31 to 34. In this way, the FIR filter unit 201 performs a convolution operation illustrated in Equation (3) and calculates and outputs an equalization signal $S''_1$.

(Column of $S'_2, S'_3,$ and $S'_4$ Illustrated in FIG. 3 Having Sampling Period i=2 to 4)

The FIR filter unit 201 performs a convolution operation illustrated in Equation (3) for a received digital signal series vector S' having sampling periods of i=2 to 4 by applying the same digital signal equalization tap coefficient series vector $h_{1r}$ thereto and outputs equalization signals S''2, S''3, and S''4.

(Column of $S'_5$ Illustrated in FIG. 3 Having Sampling Period i=5)

As described above, since M=4, i=5 becomes a second period with 4 sampling periods. The tap coefficient updating unit 90 performs an update operation set in advance on the basis of the equalization signal $S''_j$ output by the FIR filter unit 201 and outputs the updated digital signal equalization tap coefficient series vector $h_{2r} = (h_{21}, h_{22}, h_{23}, h_{24}, h_{25})$ to the multipliers 40 to 44.

The wavelength dispersion compensator 20 outputs a received digital signal series vector S' in the case of i=5, in other words, the series vector $S' = (S'_1, S'_2, S'_3, S'_4, S'_5)$ is illustrated in FIGS. 2 and 3. The FIR filter unit 201 performs a convolution operation represented in Equation (3) and outputs an equalization signal $S''_5$.

Thereafter, while tap coefficient values included in the digital signal equalization tap coefficient series vector $h_{qr}$ are updated by the tap coefficient updating unit 90 every K×4 sampling periods, the process in the case in which the sampling period i=2 to 4 and the process in the case in which the sampling period i=5 described above are repeatedly performed. By repeating the two processes, the adaptive equalizer 200 receives a received digital signal series vector S' from the wavelength dispersion compensator 20 and sequentially outputs equalization signals $S''_i$ of which the number of samples per symbol is 4/3 (samples/symbol).

The sample rate converter 400 performs down-sampling of the equalization signals $S''_i$ and outputs received symbols $S_j$ (here, j is a positive integer starting from "1" and represents received symbols in a time series) that are digital signals of 1 (samples/symbol). As the down-sampling, for example, after N-over sampling, down-sampling is executed with thinning out in M periods. In other words, according to the first embodiment, by executing 3 over-sampling and thinning-out in 4 periods, three received symbols are acquired from four equalization signals.

At this time, as equalization signals $S''_i$ every M sampling periods, for example, in the example illustrated in FIG. 3, $S''_1, S''_5, S''_9,$ and $S''_{13}$ every four sampling periods denoted using black arrows directly become received symbols S1, S4, S7, and S10. In contrast to this, as other equalization signals $S''_j$ in a time series denoted using white arrows, for example, $S''_2, S''_3, S''_4, S''_6, S''_7, S''_8, S''_{10}, S''_{11},$ and $S''_{12}$ become transition information between received symbols $S_j$. Accordingly, by executing down-sampling of equalization signals S″$_j$ with 4/3 (samples/symbol) into 1 (samples/symbol), all the received symbols S$_j$ included in the equalization signals S″$_j$ can be acquired.

By employing the configuration according to the first embodiment described above, the adaptive equalizer 200 can calculate equalization signals of which the number of samples per symbol is 4/3 by performing an equalization operation for received digital signals of which the number of samples per symbol is 4/3 output from the wavelength dispersion compensator 20. For this reason, before outputting a digital signal to the adaptive equalizer 200, the optical receiver 10 does not need to form a digital signal of "2" (samples/symbol) by performing up sampling. The adaptive equalizer 200 may perform a process for a digital signal of 4/3 (samples/symbol) without converting the sample rate. In this way, a decrease in power consumption of the adaptive equalizer 200 can be achieved.

(Another Configuration Example (1) of First Embodiment)

Figure 4:
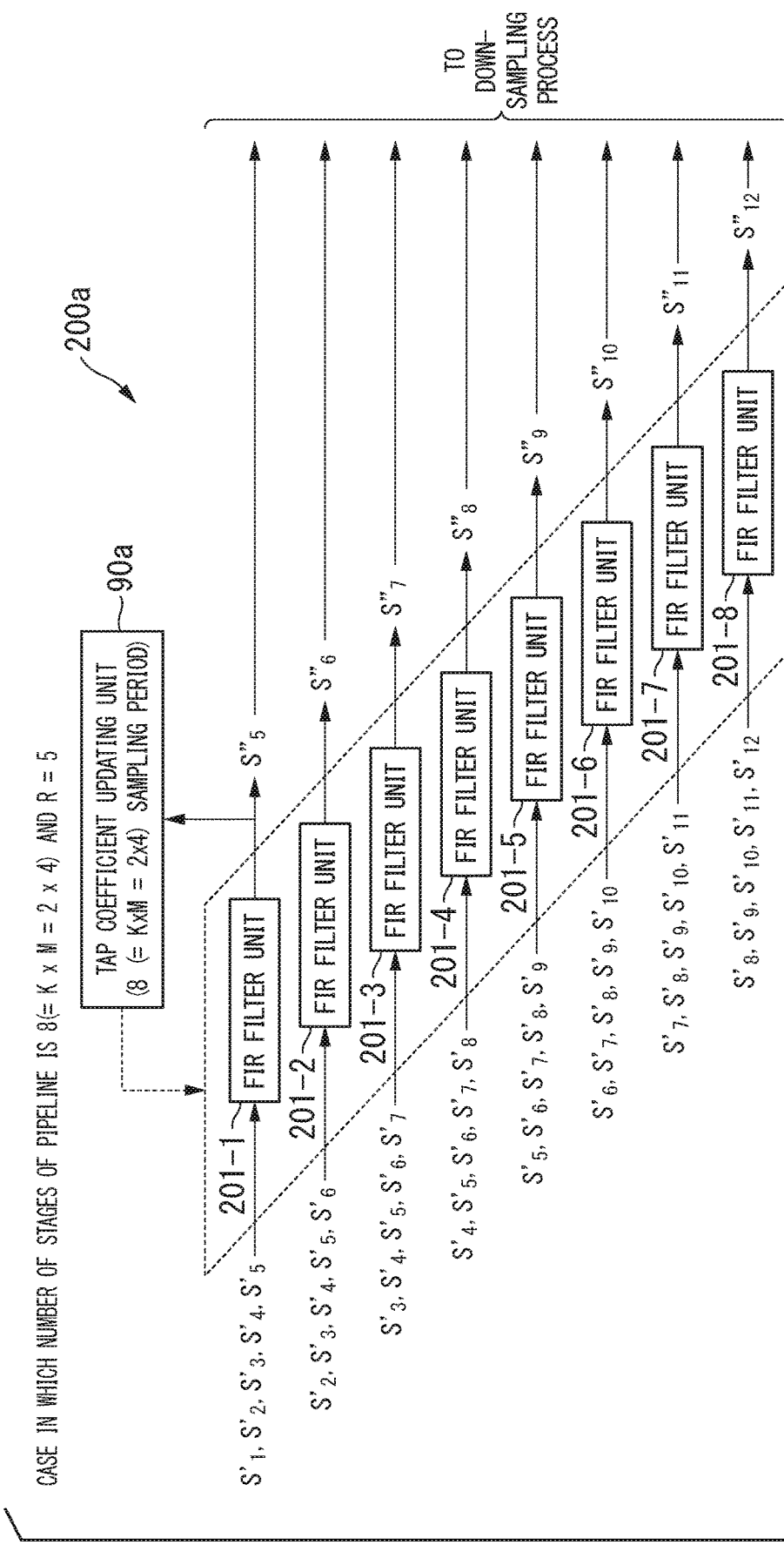
FIG. 4 is a diagram illustrating another configuration example (1) according to the first embodiment.

FIG. 4 is a block diagram illustrating the configuration of an adaptive equalizer 200*a* in another configuration example of the first embodiment. In an actual digital signal processor (DSP) applied to an adaptive equalization process for digital signals, in order to reduce an operation clock rate, generally, a pipeline process is performed using a configuration like that of the adaptive equalizer 200*a*. The number of stages of pipelines may be any number that is a number of stages satisfying K×M (here, K is a positive integer). As one example, FIG. 4 illustrates a configuration in a case in which K=2 and M=4, in other words, a configuration in which the number of stages of pipelines is eight. In addition, also in FIG. 4, similar to the case of the adaptive equalizer 200, it is assumed that N=3.

The adaptive equalizer 200*a* includes FIR filter units 201-1 to 201-8 and a tap coefficient updating unit 90*a*. Each of the FIR filter units 201-1 to 201-8 has a configuration similar to the FIR filter unit 201 illustrated in FIG. 2. For example, the FIR filter unit 201-1 includes four delay units 31-1 to 34-1, five multipliers 40-1 to 44-1, and four adders 50-1 to 53-1 in which "−1" is added to reference signs of the components included in the FIR filter unit 201.

The tap coefficient updating unit 90*a* calculates digital signal equalization tap coefficients h$_{qr}$ by performing an update operation set in advance on the basis of equalization signals S″$_j$ once every K×M (here, K×M=8) sampling periods that is the number of stages of pipelines. The tap coefficient updating unit 90*a* updates the digital signal equalization tap coefficients h$_{qr}$ by outputting the calculated digital signal equalization tap coefficients h$_{qr}$ to multipliers 40-1 to 44-1, 40-2 to 44-2, 40-3 to 44-3, 40-4 to 44-4, 40-5 to 44-5, 40-6 to 44-6, 40-7 to 44-7, 40-8 to 44-8 included in the FIR filter units 201-1 to 201-8. The equalization signal S″$_j$ output by the adaptive equalizer 200*a* is down-sampled by the sample rate converter 400 and becomes a received symbol of 1 (samples/symbol).

In addition to the effect of a decrease in the power consumption acquired by applying the adaptive equalizer 200, an effect of decreasing an operation time according to parallel execution of an equalization operation such as a convolution operation can be acquired by applying the adaptive equalizer 200*a* described above. For example, by disposing pipelines of K×M (here, K×M=8) stages, K×M convolution operations are performed in one process, and K×M received symbols are acquired.

(Another Configuration Example (2) of First Embodiment)

Figure 5:
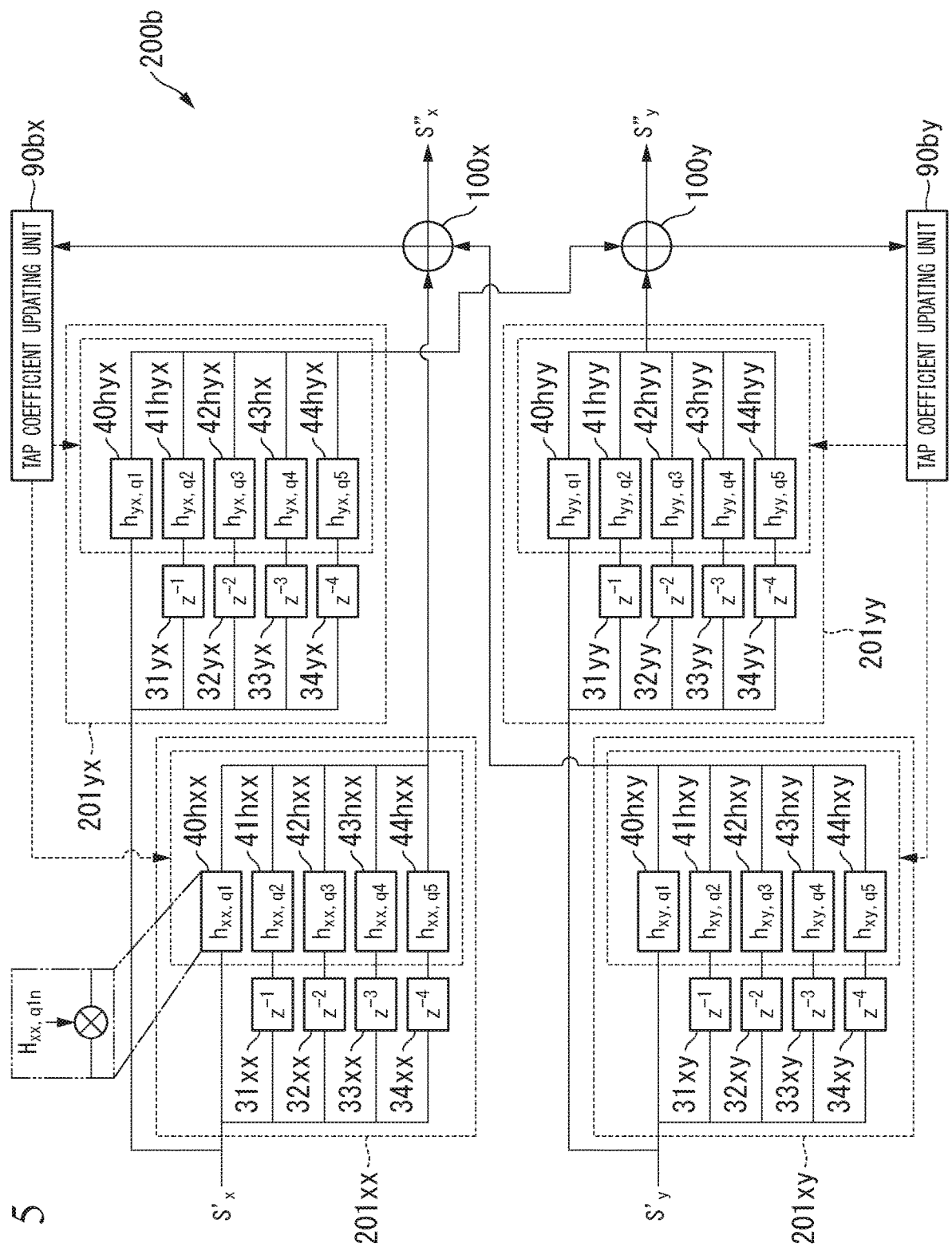
FIG. 5 is a diagram illustrating still another configuration example (2) according to the first embodiment.

FIG. 5 is a block diagram illustrating the configuration of an adaptive equalizer 200*b* in another configuration example of the first embodiment. The adaptive equalizer 200*b* illustrated in FIG. 5 has a configuration of an FIR filter that is a so called butterfly configuration applied in a case in which an optical modulation signal is a polarization multiplexed optical modulation signal and compensates for a waveform distortion due to polarization wave variations, polarization mode dispersion, and the like. In a case in which the adaptive equalizer 200*b* is applied, the optical transmitter 2 illustrated in FIG. 1 transmits a polarization multiplexed optical modulation signal including two polarized waves including an X-polarized wave, and a Y-polarized wave, and the polarization multiplexed optical modulation signal is transmitted using the optical fiber transmission line 3.

The optical coherent receiving unit 11 of the optical receiver 10 demodulates baseband signals of two polarized waves of the X polarized wave and the Y-polarized wave and outputs resultant signals to the analog-to-digital converter 12. The analog-to-digital converter 12 converts each of the baseband signals including the X-polarized wave and the Y-polarized wave into a digital signal of M/N (samples/symbol). Also in the example illustrated in FIG. 5, M=4, and N=3.

The wavelength dispersion compensator 20 performs a correction process for a digital signal including X-polarized waves with 4/3 (samples/symbol) and outputs a received digital signal series vector S'$_x$ of the X polarized waves. The wavelength dispersion compensator 20 performs a correction process for a digital signal of Y-polarized waves with 4/3 (samples/symbol) and outputs a received digital signal series vector S'$_y$ of the Y polarized waves. The received digital signal series vectors S'$_x$ of the X-polarized waves and S'$_y$ of the Y-polarized waves are complex digital signal series vectors. Each of the two digital signal series vectors S'$_x$ and S'$_y$ input to the adaptive equalizer 200*b* is composed of a digital signal of 4/3 (samples/symbol).

The adaptive equalizer 200*b* includes FIR filter units 201*xx*, 201*xy*, 201*yx*, and 201*yy*, tap coefficient updating units 90*bx* and 90*by*, and adders 100*x* and 100*y*. Each of the FIR filter units 201*xx*, 201*xy*, 201*yx*, and 201*yy* has a configuration corresponding to that of the FIR filter unit 201 illustrated in FIG. 2. For example, in the FIR filter unit 201*xx*, delay units 31*xx* to 34*xx* respectively correspond to the delay units 31 to 34 of the FIR filter unit 201, and multipliers 40*hxx* to 44*hxx* respectively correspond to the multipliers 40 to 44 of the FIR filter unit 201.

In FIG. 5, as a line diagram corresponding to the multipliers 40 to 44 illustrated in FIG. 2, blocks having quadrilateral shapes to which digital signal equalization tap coefficients h$_{xx,q1}$, h$_{xx,q2}$, h$_{xx,q3}$, h$_{xx,q4}$, and h$_{xx,q5}$ to be output to the multipliers 40*hxx* to 44*hxx* are attached are illustrated. For example, a digital signal series vector S'$_x$ of X-polarized waves is represented as (S'$_{x,i-4}$, S'$_{x,i-3}$, S'$_{x,i-2}$, S'$_{x,i-1}$, S'$_{x,i}$) in the case of R=5. The multiplier 40*hxx* of the FIR filter unit 201*xx* calculates and outputs a value of a product acquired by multiplying the digital signal equalization tap coefficient h$_{xx,q1}$ by the digital signal S'$_{x,i}$. Similar to the multiplier 40*hxx*, the multipliers 41*hxx* to 44*hxx* respectively multiply h$_{xx,q2}$ and S'$_{x,i-1}$, h$_{xx,q3}$ and S'$_{x,i-2}$, h$_{xx,q4}$ and S'$_{x,i-3}$, and h$_{xx,q5}$ and S'$_{x,i-4}$. In this way, the FIR filter unit 201*xx* performs a convolution operation between the digital signal equalization tap coefficient series vector h$_{xx,qr}$ and the received digital signal series vector S'$_x$ of X-polarized waves.

Each of the FIR filter units 201*xy*, 201*yx*, and 201*yy*, similar to the FIR filter unit 201*xx*, may also have a configuration similar to that of the FIR filter unit 201. The FIR filter unit 201*xy* performs a convolution operation between the digital signal equalization tap coefficient series vector h$_{xy,qr}$ and the received digital signal series vector S'$_y$ of Y-polarized waves. The FIR filter unit 201yx performs a convolution operation between the digital signal equalization tap coefficient series vector $h_{yx,qr}$ and the received digital signal series vector S'$_x$ of X-polarized waves. The FIR filter unit 201yy performs a convolution operation between the digital signal equalization tap coefficient series vector $h_{yy,qr}$ and the received digital signal series vector S'$_y$ of Y-polarized waves.

The adder 100x calculates an equalization signal S"$_x$ with 4/3 (samples/symbol) by adding values of products output by the multipliers 40hxx to 44hxx and the multipliers 40hxy to 44hxy included in the FIR filter unit 201xx and the FIR filter unit 201xy. The adder 100y calculates an equalization signal S"$_y$ with 4/3 (samples/symbol) by adding values of products output by the multipliers 40hyx to 44hyx and the multipliers 40 hyy to 44 hyy included in the FIR filter unit 201yx and the FIR filter unit 201yy.

The sample rate converter 400 performs down-sampling of the equalization signal S"$_x$ and the equalization signal S"$_y$ with 4/3 (samples/symbol) output by the adaptive equalizer 200b into a digital signal of 1 (samples/symbol) and acquires a received symbol S$_j$.

The tap coefficient updating unit 90bx calculates digital signal equalization tap coefficient series vectors $h_{xx,qr}$ and $h_{yx,qr}$ by performing an update operation set in advance on the basis of the equalization signal S"$_x$ once every K×M sampling periods (here, K×4 sampling period). The tap coefficient updating unit 90bx outputs the updated digital signal equalization tap coefficient series vectors $h_{xx,qr}$ and $h_{yx,qr}$ respectively to the FIR filter units 201xx and 201yx.

The tap coefficient updating unit 90b y calculates digital signal equalization tap coefficient series vectors $h_{xy,qr}$ and $h_{yy,qr}$ by performing an update operation set in advance on the basis of the equalization signal S"$_x$ once every K×M sampling periods (here, K×4 sampling period). The tap coefficient updating unit 90by outputs the updated digital signal equalization tap coefficient series vectors $h_{xy,qr}$ and $h_{yy,qr}$ respectively to the FIR filter units 201xy and 201yy.

By applying the adaptive equalizer 200b described above, the optical receiver 10 can perform demodulation and an equalization operation of digital signals of which the number of samples per symbol is 4/3 for X-polarized waves and Y-polarized waves included in the polarization multiplexed optical modulation signal and output equalization signals S"$_x$, S"$_y$ of which the number of samples per symbol is 4/3. Before outputting a digital signal to the adaptive equalizer 200b, the optical receiver 10 does not need to convert the digital signal into a digital signal of 2 (samples/symbol) through up-sampling, and accordingly, a decrease in the power consumption of the adaptive equalizer 200b is achieved.

The adaptive equalizer 200b illustrated in FIG. 5 does not have components corresponding to the adders 50 to 53 of the FIR filter unit 201 but has a configuration in which the adder 100x adds values output by the multipliers 40hxx to 44hxx of the FIR filter unit 201xx and values output by the multipliers 40hxy to 44hxy of the FIR filter unit 201xy. In addition, the adaptive equalizer 200b has a configuration in which the adder 100y adds values output by the multipliers 40hyx to 44hyx of the FIR filter unit 201yx and values output by the multipliers 40hyy to 44hyy of the FIR filter unit 201yy. However, the configuration of the present invention is not limited to the embodiment, and the adaptive equalizer 200b, similar to the adders 50 to 53 of the FIR filter unit 201, may include an adder at output terminals of the multipliers 41hxx to 44hxx of the FIR filter unit 201xx, add products output by the multipliers 40hxx to 44hxx, and then output a result of the addition to the adder 100x.

Second Embodiment

Figure 6:
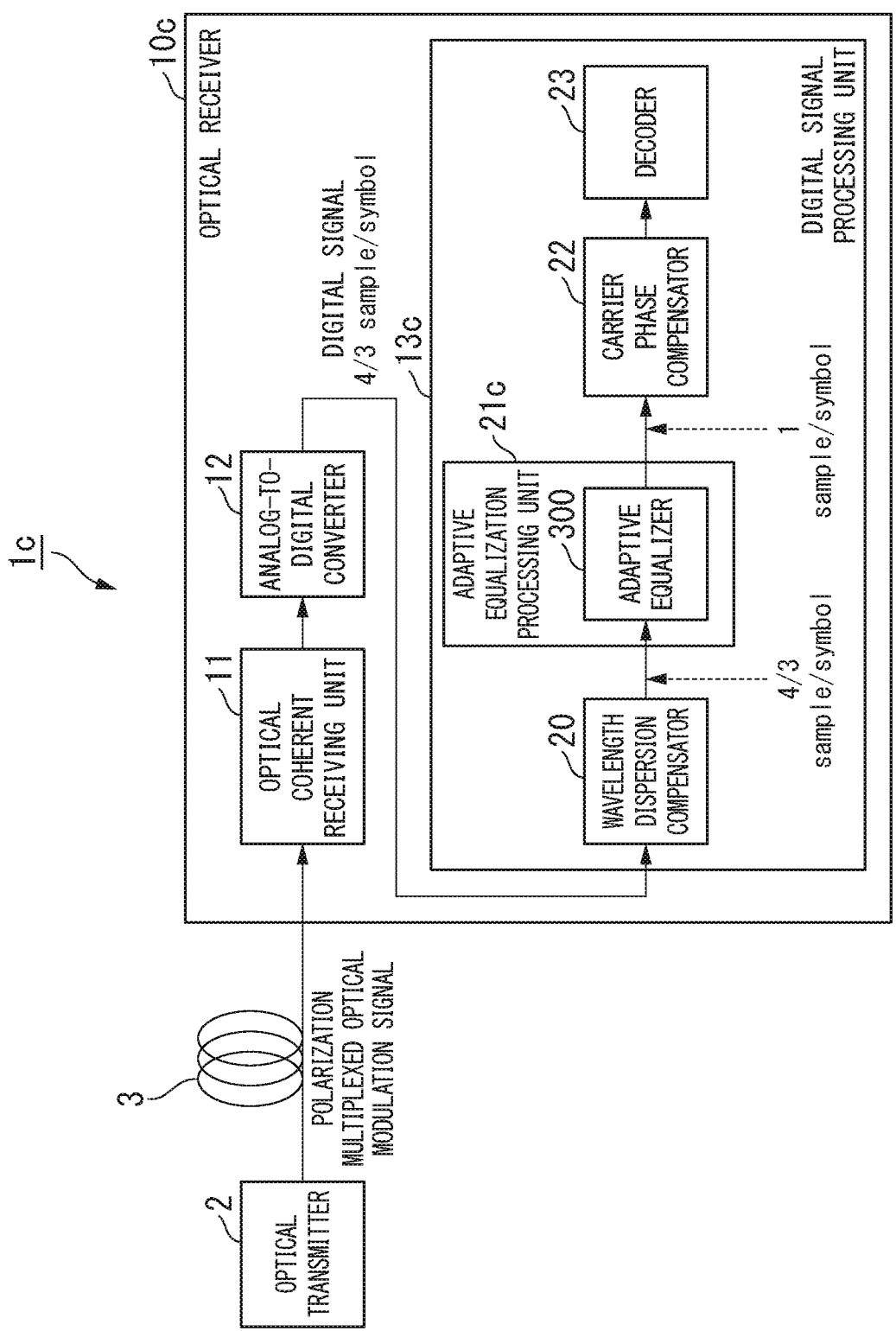
FIG. 6 is a diagram illustrating a configuration of an optical communication system according to a second embodiment.

FIG. 6 is a block diagram illustrating the configuration of an optical communication system 1c according to a second embodiment. The same reference sign will be assigned to the same component as that according to the first embodiment, and, hereinafter, different components will be described. The optical communication system 1c includes an optical transmitter 2, an optical fiber transmission line 3, and an optical receiver 10c. The optical receiver 10c includes an optical coherent receiving unit 11, an analog-to-digital converter 12, and a digital signal processing unit 13c. The digital signal processing unit 13c includes a wavelength dispersion compensator 20, an adaptive equalization processing unit 21c, a carrier phase compensator 22, and a decoder 23. The adaptive equalization processing unit 21c includes an adaptive equalizer 300.

Similar to the first embodiment, the analog-to-digital converter 12 converts the baseband signal output by the optical coherent receiving unit 11 into a digital signal of which the number of samples per symbol is M/N (samples/symbol) and outputs the digital signal. Here, M and N are positive integers having values for which M/N is not an integer, and a relationship of M>N is satisfied. Similar to the first embodiment, also in the second embodiment, M=4 and N=3 will be assumed in the description.

The wavelength dispersion compensator 20 compensates for a digital signal of 4/3 (samples/symbol) and outputs the compensated digital signal of 4/3 (samples/symbol) to the adaptive equalization processing unit 21c. The adaptive equalizer 300 performs an equalization operation set in advance for a digital signal of which the number of samples per symbol is 4/3 (samples/symbol) output by the wavelength dispersion compensator 20 to compensate for a wavelength distortion and outputs a digital signal of 4/3 (samples/symbol). Here, the equalization operation set in advance, for example, is a convolution operation of applying equalization tap coefficients to a received digital signal output by the wavelength dispersion compensator 20.

Figure 7:
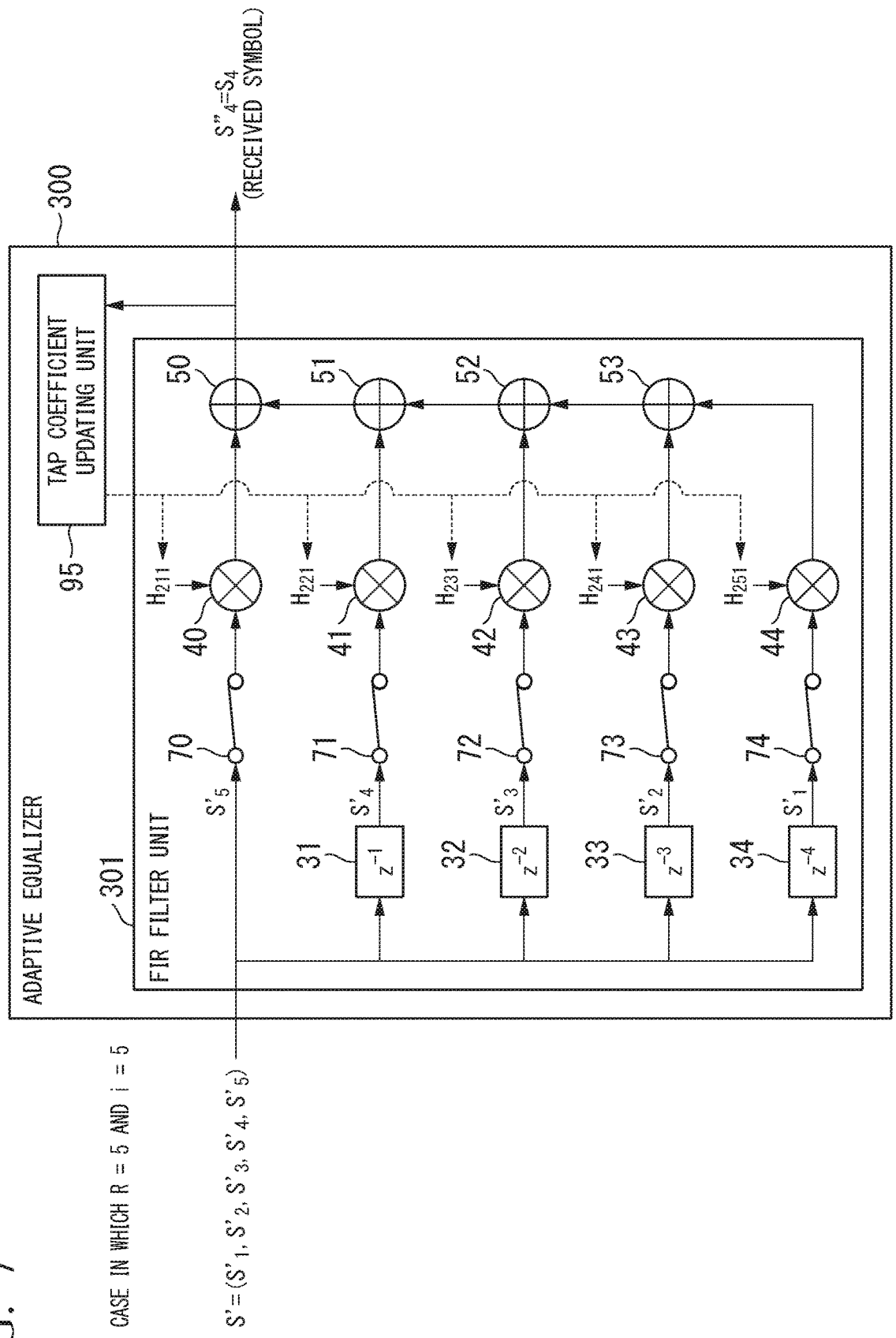
FIG. 7 is a diagram illustrating a configuration of an adaptive equalizer according to the second embodiment.

FIG. 7 is a block diagram illustrating the configuration of the adaptive equalizer 300. The adaptive equalizer 300 includes an FIR filter unit 301 and a tap coefficient updating unit 95. The FIR filter unit 301, similar to the FIR filter unit 201 according to the first embodiment, includes delay units 31 to 34, multipliers 40 to 44, and adders 50 to 53 and further includes switches 70 to 74. In the adaptive equalizer 300, the tap coefficient updating unit 95 performs a convolution operation of a digital signal equalization tap coefficient series vector $h_{qr}$ and a phase shift tap coefficient series vector $P_{nu}$ and calculates a digital signal equalization/phase-shift tap coefficient series vector $H_{qrn}$. Here, the phase shift tap coefficient series vector $P_{nu}$ is represented in the following Equation (4).

[Math. 4]

$$P_{nu} = (P_{n1}, P_{n2}, \ldots, P_{nU}) \quad (4)$$

In Equation (4), n and u are positive integers, n=1, 2, . . . , N, and u=1, 2, . . . , U. In the second embodiment, since N=3, n=1, 2, 3. In addition, U is the number of taps when a convolution operation of the digital signal equalization tap coefficient series vector $h_{qr}$ and the phase shift tap coefficient series vector $P_{nu}$ is executed, and FIG. 7 illustrates an example of a case in which U=5, R=5, i=5, and an update of the tap coefficients is executed once (q=2). Individual phase shift tap coefficients $P_{nu}$ of N series included in the phase shift tap coefficient series vector $P_{nu}$ are coefficient values designed in advance with a difference between sampling points of a received digital signal and a received symbol taken into account. For example, coefficient values of the phase shift tap coefficients $P_{nu}$ of the N series are set on the basis of a difference between a sampling timing of each received digital signal that is a target for an equalization operation and a calculated symbol timing of a received symbol. In addition, the digital signal equalization/phase-shift tap coefficient series vector $H_{qrn}$ is represented using the following Equation (5).
[Math. 5]

$$H_{qrn}=h_{qr}*P_{nu} \quad (5)$$

The tap coefficient updating unit 95 calculates a digital signal equalization/phase-shift tap coefficient series vector $H_{1r1}$ by executing a convolution operation of a digital signal equalization tap coefficient series vector $h_{1r}$ that is an initial value and a phase shift tap coefficient $P_{1u}$ set in advance. The tap coefficient updating unit 95 calculates digital signal equalization/phase-shift tap coefficient series vectors $H_{1r2}$ and $H_{1r3}$ by executing a convolution operation convoluting phase shift tap coefficients $P_{2u}$ and $P_{3u}$ in a next sampling period and a subsequent sampling period next to the next sampling period for the digital signal equalization tap coefficient series vector $h_{1r}$ that is an initial value. The tap coefficient updating unit 95 outputs each of coefficient values included in the digital signal equalization/phase-shift tap coefficient series vectors $H_{1r1}$, $H_{1r2}$, and $H_{1r3}$ that are initial values to the multipliers 40 to 44 in a sampling period corresponding thereto. In other words, the tap coefficient updating unit 95 calculates N digital signal equalization/phase-shift tap coefficient series vectors $H_{qrn}$ for M received digital signal series vectors S' input in the M sampling periods. The N digital signal equalization/phase-shift tap coefficient series vectors $H_{qrn}$ respectively correspond to N received symbols calculated from the M received digital signal series vector S'.

The tap coefficient updating unit 95 executes an update operation set in advance once every K×M (here, K×4) sampling periods (here, K is a positive integer) on the basis of the received symbol $S_j$ output by the FIR filter unit 301 and calculates a digital signal equalization tap coefficient series vector $h_{qr}$ after the update. The tap coefficient updating unit 95 calculates digital signal equalization/phase-shift tap coefficient series vectors $H_{qr1}$, $H_{qr2}$, and $H_{qr3}$ by executing a convolution operation of the digital signal equalization tap coefficient series vector $h_{qr}$ after the update that has been calculated by the update operation and each of the phase shift tap coefficient $P_{1u}$, $P_{2u}$, and $P_{3u}$ set in advance in a sampling period corresponding thereto. The tap coefficient updating unit 95 outputs coefficient values included in the calculated digital signal equalization/phase-shift tap coefficient series vectors $H_{qr1}$, $H_{qr2}$, and $H_{qr3}$ to the multipliers 40 to 44 in a sampling period corresponding thereto.

Each of the multipliers 40 to 44 calculates a product by multiplying a tap coefficient $H_{qrn}$ that is an individual component of the digital signal equalization/phase-shift tap coefficient series vector $H_{qrn}$ output from the tap coefficient updating unit 95 and a received digital signal $S'_i$ that is an individual component of the received digital signal series vector S'. In this way, the FIR filter unit 301 executes a convolution operation represented in the following Equation (6).
[Math. 6]

$$S=S''=(h_{qr}*P_{nu})*S'=H_{qrn}*S' \quad (6)$$

In Equation (6), S represents a received symbol series vector, and S" represents an equalization signal series vector. Here, the received symbol series vector S is a vector having a received symbol $S_j$ as its component. The adaptive equalizer 300 performs down-sampling into a digital signal of 1 (samples/symbol) by switching all the switches 70 to 74 to an off state once every four sampling periods in addition to the convolution operation represented in Equation (6). In accordance with the convolution operation represented in Equation (6) and the switching of the switches 70 to 74, the equalization signal series vector S" becomes the received symbol series vector S.

As represented in Equation (6), the tap coefficient updating unit 95 executes the process of a convolution operation convoluting the phase shift tap coefficient series vector $P_{nu}$ in the digital signal equalization tap coefficient series vector $h_{qr}$ in advance. Accordingly, in the FIR filter unit 301, the convolution operation represented in Equation (6) can be omitted for the number of times corresponding to a difference (M−N) between M and N for every M sampling periods. In other words, by the FIR filter unit 301 executing the convolution operation represented in Equation (6) N times every M sampling periods, N received symbols are acquired. Here, M=4 and N=3, and a difference, in other words, 4−3=1, and accordingly, the convolution operation can be omitted once every four sampling periods. In the FIR filter unit 301, for example, the switches 70 to 74 are controlled in accordance with a clock signal included in the optical receiver 10c and are switched to the off state once every four sampling periods and are in the on state in the other states.

Figure 8:
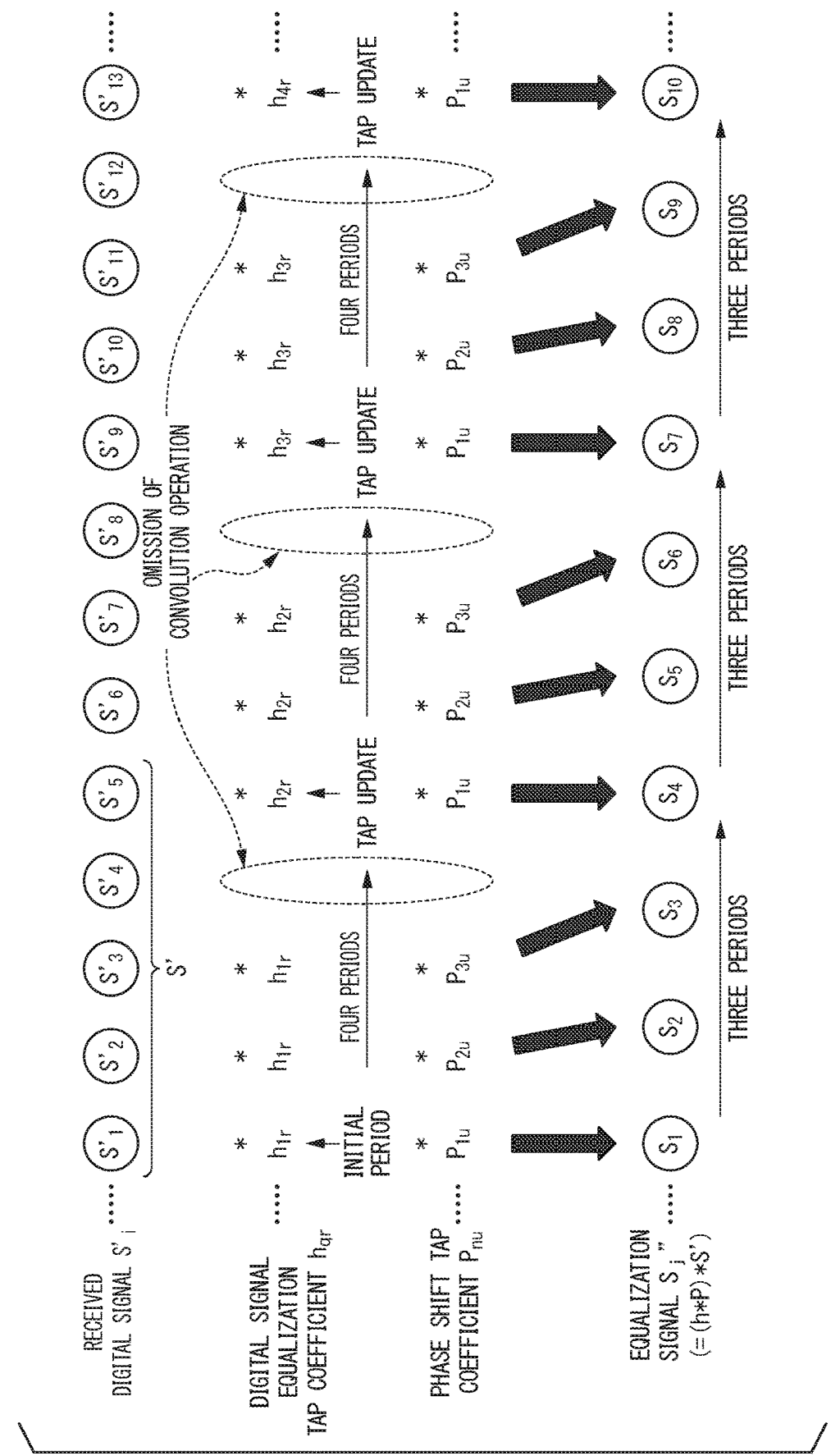
FIG. 8 is a diagram illustrating a process performed by an adaptive equalization processing unit according to the second embodiment.

Next, a process executed by the adaptive equalizer 300 of the adaptive equalization processing unit 21c according to the second embodiment will be described with reference to FIGS. 7 and 8. FIG. 8 illustrates an example in which M=4, N=3, and R=5 (r=1, 2, . . . , 5). A received digital signal $S'_i$ is a digital signal of 4/3 (samples/symbol). An equalization signal $S''_i$ $(=h_{rq}*S')$ is a signal with 4/3 (samples/symbol). As will be described later, since the equalization signal $S''_j$ and the received symbol $S_j$ coincide with each other, a convolution operation of a phase shift tap coefficient $P_{1u}$ and a digital signal equalization tap coefficient series vector $h_{qr}$ may be omitted. The convolution operation is omitted once (=4−3) every four sampling periods.

(Column of $S'_1$ Illustrated in FIG. 8 having Sampling Period i=1)

The tap coefficient updating unit 95 executes a convolution operation represented in Equation (5) on the basis of the initial value of the digital signal equalization tap coefficient series vector $h_{1r}$ and a phase shift tap coefficient $P_{1u}$ set in advance. In accordance with the convolution operation represented in Equation (5), the tap coefficient updating unit 95 calculates a digital signal equalization/phase-shift tap coefficient series vector $H_{1r1}=(H_{111}, H_{121}, H_{131}, H_{141}, H_{151})$ that have initial values. Here, $H_{111}=h_{11}*P_{11}$, $H_{121}=h_{12}*P_{12}$, $H_{131}=h_{13}*P_{13}$, $H_{141}=h_{14}*P_{14}$, and $H_{151}=h_{15}*P_{15}$.

By executing a convolution operation of a digital signal equalization tap coefficient series vector $h_{qr}$ having R components and a phase shift tap coefficient series vector $P_{nu}$ having U components, a vector having (R+U−1) components is acquired. The tap coefficient updating unit 95 has 5 (R=5) continuous components including a center component among (R+U−1) components calculated in the convolution operation as components of the digital signal equalization/phase-shift tap coefficient series vector $H_{qrn}$. For example, the center component is the ceil((R+U−1)/2)-th component. Here, "ceil( )" is a ceiling function and rounds up digits after the decimal point. In addition, in a case in which $(R+U-1)/2$ is an even number, the center component may be a floor $((R+U-1)/2)$-th component. Here, "floor( )" is a floor function and truncates a fractional part.

The tap coefficient updating unit 95 may have four or less or six or more components among $(R+U-1)$ components calculated in the convolution operation as components of the digital signal equalization/phase-shift tap coefficient series vector. The adaptive equalizer 300 may have all the $(R+U-1)$ components calculated in a convolution operation of the digital signal equalization tap coefficient series vector $h_{qr}$ and the phase shift tap coefficient series vector $P_{nu}$ as tap coefficients of the FIR filter unit 301. Alternatively, the adaptive equalizer 300 may use components of a number corresponding to the calculation capability of the FIR filter unit 301 among $(R+U-1)$ components calculated in the convolution operation as tap coefficients of the FIR filter unit 301. Some continuous center components including a center component among components calculated in the convolution operation may be used for a digital signal equalization/phase-shift tap coefficient series vector. By using some center components for the digital signal equalization/phase-shift tap coefficients series vector, the circuit configuration of the adaptive equalizer 300 can be simplified.

The tap coefficient updating unit 95 outputs a digital signal equalization/phase-shift tap coefficient series vector $H_{1r1}=(H_{111}, H_{121}, H_{131}, H_{141}, H_{151})$ to the multipliers 40 to 44. The wavelength dispersion compensator 20 outputs a received digital signal series vector $S'=(S'_{-3}, S'_{-2}, S'_{-1}, S'_0, S'_1)$ in the case of $i=1$. The digital signal $S'_1$ is output to the multiplier 40, and $S'_0, S'_{-1}, S'_{-2}$, and $S'_{-3}$ are respectively output to the multipliers 41 to 44 through the delay units 31 to 34. In this way, the FIR filter unit 301 executes a convolution operation represented in Equation (6) and outputs an equalization signal $S''_1$. This equalization signal $S''_1$ becomes a digital signal of which the number of samples per symbol is 1, in other words, a received symbol S1.

(Column of $S'_2$ Illustrated in FIG. 8 Having Sampling Period $i=2$)

The tap coefficient updating unit 95 calculates a digital signal equalization/phase-shift tap coefficient series vector $H_{1r2}=(H_{112}, H_{122}, H_{132}, H_{142}, H_{152})$ having initial values by executing a convolution operation represented in Equation (5) on the basis of the initial value of the digital signal equalization tap coefficient series vector $h_{1r}$ and a phase shift tap coefficient $P_{2u}$ set in advance. The tap coefficient updating unit 95 outputs a digital signal equalization/phase-shift tap coefficient series vector $H_{1r2}$ to the multipliers 40 to 44. The wavelength dispersion compensator 20 outputs a received digital signal series vector $S'=(S'_{-2}, S'_{-1}, S'_0, S'_1, S'_2)$ in the case of $i=2$. In this way, the FIR filter unit 301 executes a convolution operation represented in Equation (6) and outputs an equalization signal $S''_2$, in other words, a received symbol S2.

(Column of $S'_3$ Illustrated in FIG. 8 Having Sampling Period $i=3$)

The tap coefficient updating unit 95 calculates a digital signal equalization/phase-shift tap coefficient series vector $H_{1r3}=(H_{113}, H_{123}, H_{133}, H_{143}, H_{153})$ having initial values by executing a convolution operation represented in Equation (5) on the basis of the initial value of the digital signal equalization tap coefficient series vector $h_{1r}$ and a phase shift tap coefficient $P_{3u}$ set in advance. The tap coefficient updating unit 95 outputs a digital signal equalization/phase-shift tap coefficient series vector $H_{1r3}$ to the multipliers 40 to 44. The wavelength dispersion compensator 20 outputs a received digital signal series vector $S'=(S'_{-1}, S'_0, S'_1, S'_2, S'_3)$ in the case of $i=3$. In this way, the FIR filter unit 301 executes a convolution operation represented in Equation (6) and outputs an equalization signal $S''_3$, in other words, a received symbol S3.

(Column of $S'_4$ Illustrated in FIG. 8 having Sampling Period $i=4$)

Figure 9:
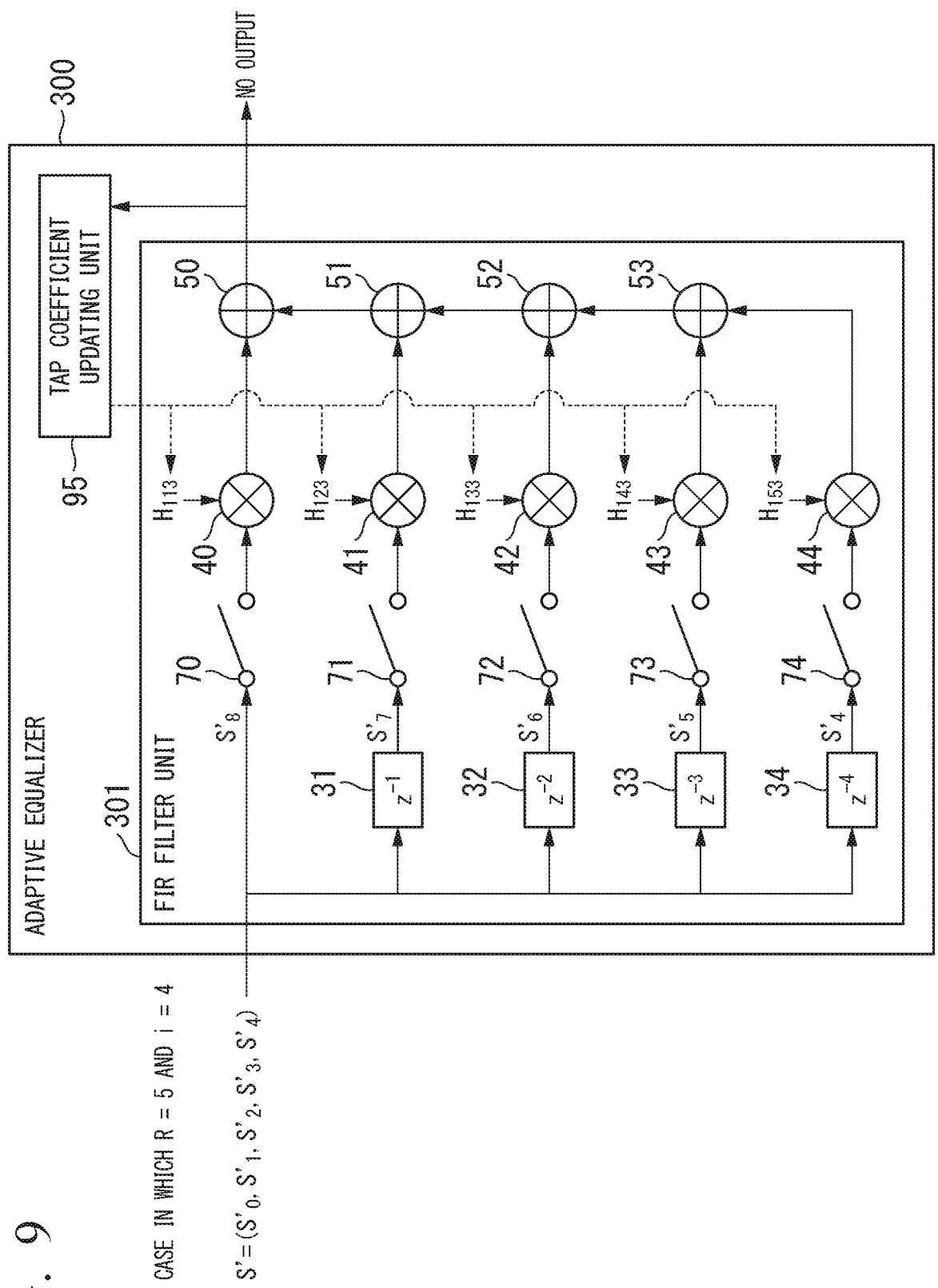
FIG. 9 is a diagram illustrating the configuration of an off state of the adaptive equalizer according to the second embodiment.

As described above, since the convolution operation represented in Equation (6) can be omitted once every four sampling periods, the adaptive equalizer 300, as illustrated in FIG. 9, sets the switches 70 to 74 to the off state. In addition, in FIG. 9, although the tap coefficient updating unit 95, similar to the sampling period $(i=3)$, is illustrated to output a digital signal equalization/phase-shift tap coefficient series vector $H_{1r3}$, a received digital signal series vector S' is not output to the multipliers 40 to 44, and accordingly, a multiplication process is not executed. For this reason, the tap coefficient updating unit 95 may not output the digital signal equalization/phase-shift tap coefficient series vector $H_{1r3}$ to the multipliers 40 to 44.

Components of the digital signal equalization/phase-shift tap coefficient series vector $H_{1r3}$ in the example in which $q=1$ and $n=3$ illustrated in FIG. 9 are as follows:
$H_{113}=h_{11}*P_{31}$, $H_{123}=h_{12}*P_{32}$, $H_{133}=h_{13}*P_{33}$, $H_{143}=h_{14}*P_{34}$, and $H_{153}=h_{15}*P_{35}$.

(Column of $S'_5$ Illustrated in FIG. 8 having Sampling Period $i=5$)

The tap coefficient updating unit 95 calculates a digital signal equalization tap coefficient series vector $h_{2r}$ by executing an update operation set in advance on the basis of a received symbol $S_j$ output by the FIR filter unit 301. The tap coefficient updating unit 95, as illustrated in FIG. 7, calculates a digital signal equalization/phase-shift tap coefficient series vector $H_{2r1}=(H_{211}, H_{221}, H_{231}, H_{241}, H_{251})$ by executing a convolution operation represented in Equation (5) on the basis of the digital signal equalization tap coefficient series vector $h_{2r}$ and a phase shift tap coefficient $P_{1u}$ calculated by the update operation. Here, $H_{211}=h_{21}*P_{11}$, $H_{221}=h_{22}*P_{12}$, $H_{231}=h_{23}*P_{13}$, $H_{241}=h_{24}*P_{14}$, and $H_{251}=h_{25}*P_{15}$.

The tap coefficient updating unit 95 outputs the calculated digital signal equalization/phase-shift tap coefficient series vector $H_{2r1}=(H_{211}, H_{221}, H_{231}, H_{241}, H_{251})$ to the multipliers 40 to 44. The wavelength dispersion compensator 20 outputs a received digital signal series vector S' in the case of $i=5$, in other words, the series vector $S'=(S'_1, S'_2, S'_3, S'_4, S'_5)$ illustrated in FIGS. 7 and 8. In this way, the FIR filter unit 301 executes a convolution operation represented in Equation (6) and outputs an equalization signal $S''_4$, in other words, a received symbol S4.

Thereafter, while tap coefficient values included in the digital signal equalization/phase-shift tap coefficient series vector $H_{qrn}$ are updated by the tap coefficient updating unit 95 every $K \times 4$ sampling periods, the process in the case of the sampling period $i=2$ to $4$ and the process in the case of the sampling period $i=5$ described above are repeated. By repeating the two processes, the adaptive equalizer 300 receives a received digital signal series vector S' from the wavelength dispersion compensator 20 and sequentially outputs received symbols $S_j$ of 1 (samples/symbol).

In the second embodiment described above, although the convolution operation represented in Equation (6) is omitted in a sampling period with $i=4 \times T$ (here, T is a positive integer), the configuration of the present invention is not limited to this embodiment. The omission of the convolution operation may be performed at an arbitrary timing within M sampling periods. The adaptive equalizer 300 may omit the convolution operation represented in Equation (6) when $i=2$ in the example illustrated in FIG. 8, in other words, at the timing of the digital signal S'$_2$ or when i=3, in other words, at the timing of the digital signal S'$_3$.

In the convolution operation using the first phase shift tap coefficient P$_{1u}$ (in the case of n=1) of the M sampling periods, an equalization signal S''$_j$ acquired by executing a convolution operation of the digital signal equalization tap coefficient series vector h$_{qr}$ and the received digital signal series vector S' directly becomes the received symbol S$_j$. In other words, the sampling timing of the received digital signal S'$_i$ and the symbol timing of the received symbol S$_j$ coincide with each other. For this reason, the adaptive equalizer 300 may execute only the convolution operation represented in Equation (3) that is the same as the first embodiment without executing the operation represented in Equation (6) convoluting the phase shift tap coefficient series vector P$_{nu}$. In this way, the adaptive equalizer 300 can decrease the amount of calculation.

Figure 10:
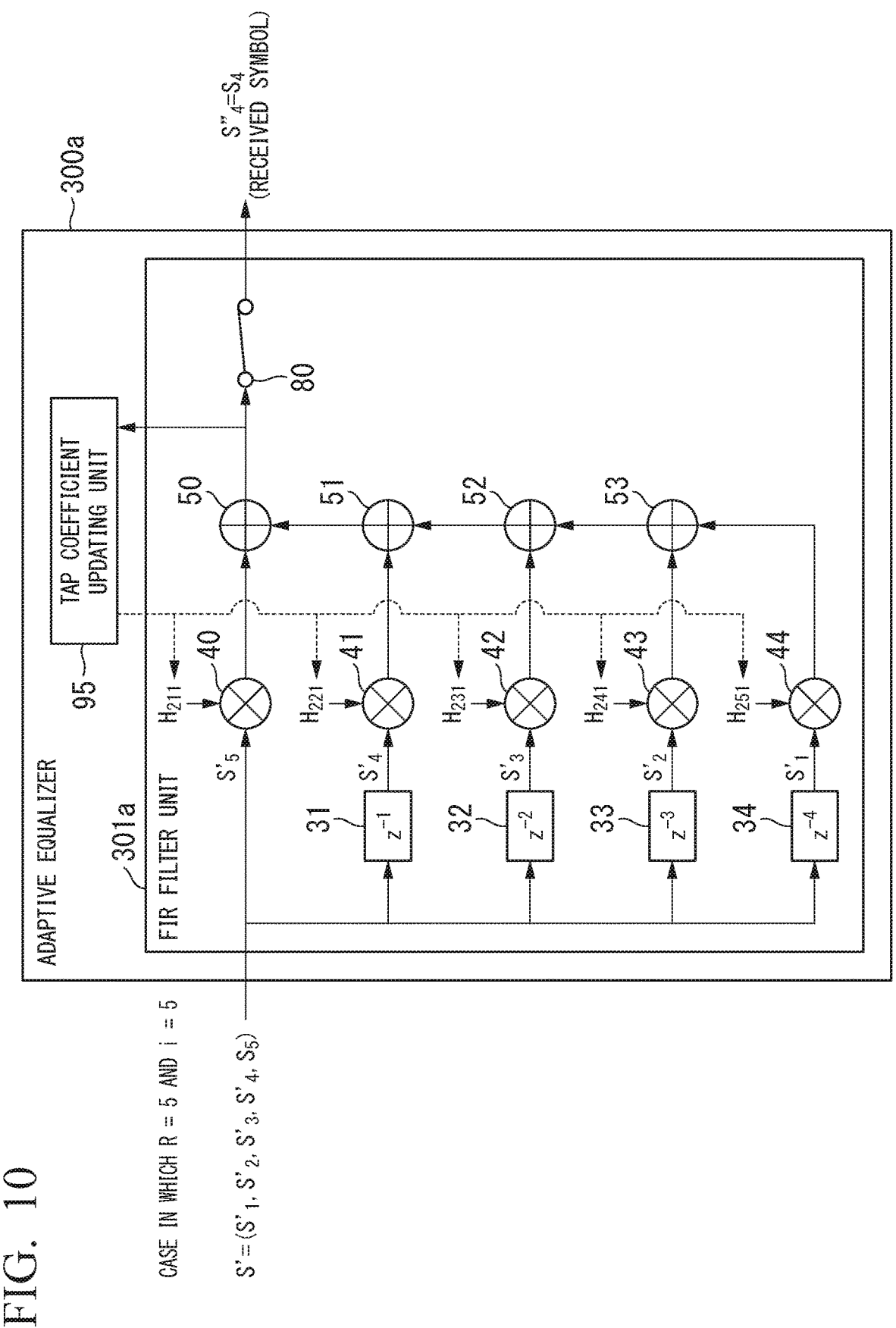
FIG. 10 is a diagram illustrating another configuration example (1) of the adaptive equalizer according to the second embodiment.
Figure 11:
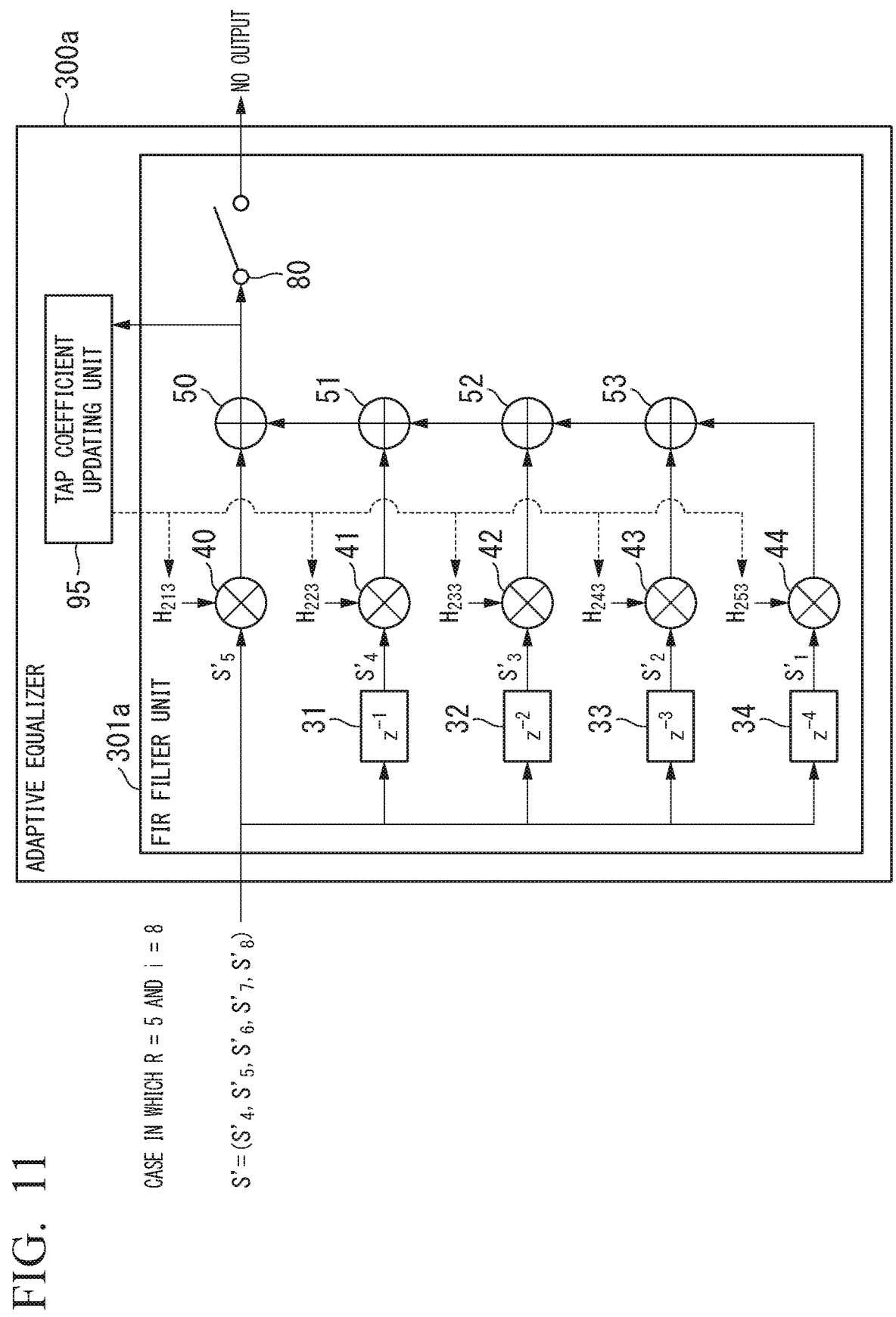
FIG. 11 is a diagram illustrating still another configuration example (2) of the adaptive equalizer according to the second embodiment.

Instead of the switches 70 to 74, like the FIR filter unit 301a of the adaptive equalizer 300a illustrated in FIGS. 10 and 11, the adaptive equalizer 300 may include a switch 80 at the output side of the adder 50. By configuring as such, the number of switches 70 to 74 can be decreased. FIG. 10 illustrates a case in which the sampling period that is the same as that illustrated in FIG. 7 i=5.

Components of the digital signal equalization/phase-shift tap coefficient series vector H$_{2r1}$ in the example in which q=2 and n=1 illustrated in FIG. 10 are as follows: H$_{211}$=h$_{21}$*P$_{11}$, H$_{221}$=h$_{23}$*P$_{12}$, H$_{231}$=h$_{23}$*P$_{13}$, H$_{241}$=h$_{24}$*P$_{14}$, and H$_{251}$=h$_{25}$*P$_{15}$.

FIG. 11 illustrates a case in which a sampling period in which the switch 80 becomes the off state after three sampling periods of i=5 is i=8. Components of the digital signal equalization/phase-shift tap coefficient series vector H$_{2r1}$ in the example in which q=2 and n=3 illustrated in FIG. 11 are as follows due to omission of the convolution operation with a phase shift tap coefficient: H$_{213}$=h$_{21}$*P$_{31}$, H$_{223}$=h$_{22}$*P$_{32}$, H$_{233}$=h$_{23}$*P$_{33}$, H$_{243}$=h$_{24}$*P$_{34}$, H$_{253}$=h$_{25}$*P$_{35}$.

The adaptive equalizer 300 according to the second embodiment executes an equalization operation using the digital signal equalization/phase-shift tap coefficient series vector H$_{qrn}$ obtained by convoluting the phase shift tap coefficient P$_{nu}$ with the digital signal equalization tap coefficient series vector h$_{qr}$ in advance. In accordance with the equalization operation, the adaptive equalizer 300 can calculate and output an equalization signal of 1 (samples/symbol), in other words, a received symbol from a digital signal of which the number of samples per symbol is 4/3. For this reason, the optical receiver 10c does not need to form a digital signal of 2 (samples/symbol) through up-sampling before outputting the digital signal to the adaptive equalizer 300. In this way, the optical receiver 10c can decrease the power consumption of the adaptive equalizer 300.

(Another Configuration Example (1) of Second Embodiment)

Figure 12:
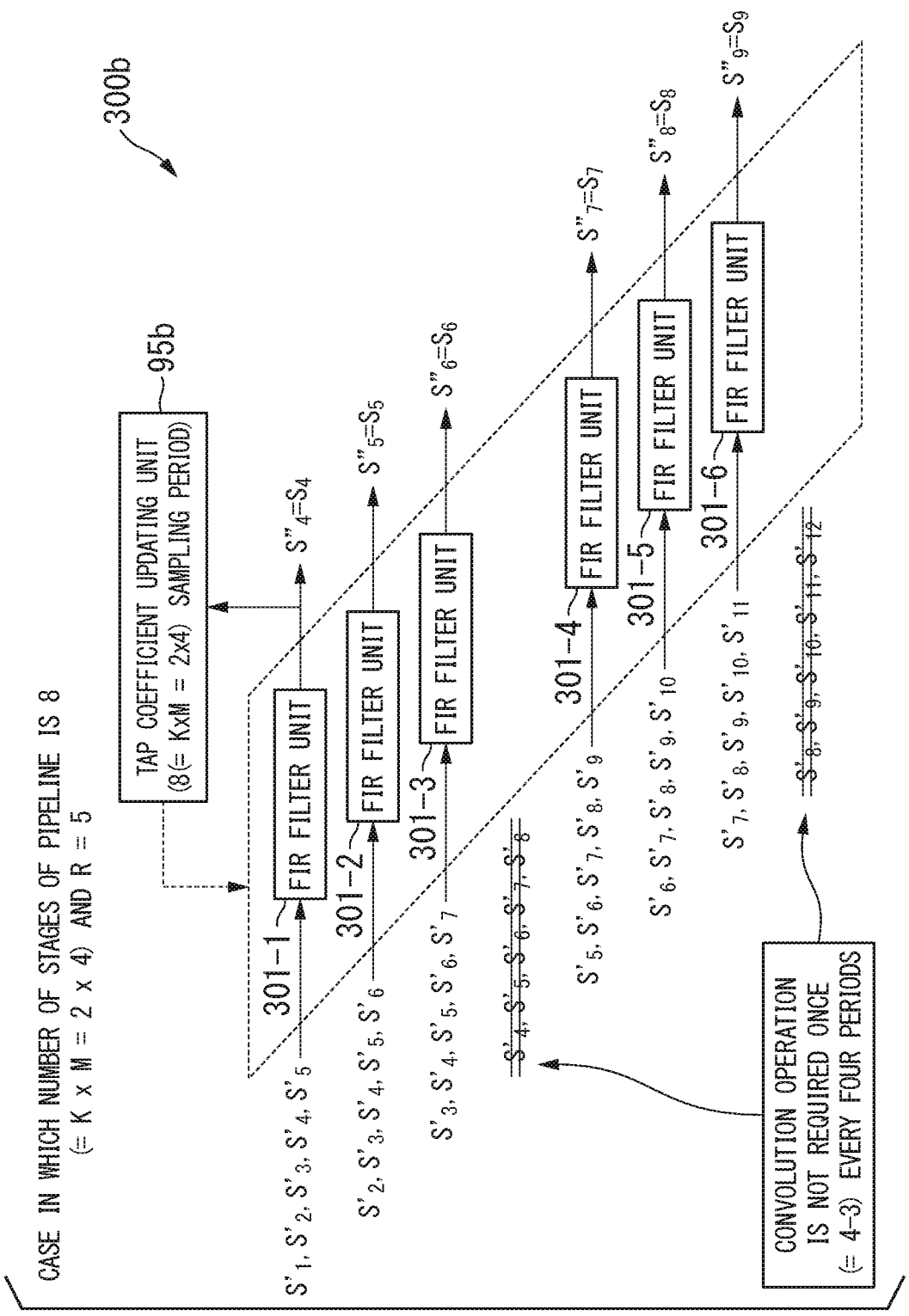
FIG. 12 is a diagram illustrating another configuration example (1) according to the second embodiment.

FIG. 12 is a block diagram illustrating the configuration of an adaptive equalizer 300b according to another configuration example of the second embodiment. The same reference sign will be assigned to the same component as that according to the first embodiment, and, hereinafter, different components will be described. The adaptive equalizer 300b, similar to the adaptive equalizer 200a according to the first embodiment described with reference to FIG. 4, has a configuration in which a pipeline process is executed. The number of stages of pipelines may be any number that is a number of stages satisfying K×M (here, K is a positive integer). FIG. 12 illustrates a case in which K=2 and M=4 as one example, in other words, a configuration in which the number of stages of pipelines is 8. In the second embodiment, since (M−N) convolution operations can be omitted within M sampling periods as described above, the number of stages that are needed to be actually included is K×M−K×(M−N). Accordingly, in the example illustrated in FIG. 12, K×(M−N) becomes 2×(4−3)=2, and the adaptive equalizer 300b has a configuration including 6 FIR filter units 301-1 to 301-6 acquired by subtracting 2 from 8.

The adaptive equalizer 300b includes FIR filter units 301-1 to 201-6 and a tap coefficient updating unit 95b. Each of the FIR filter units 301-1 to 301-6 has a configuration corresponding to that of the FIR filter unit 301 illustrated in FIG. 7, and, for example, the FIR filter unit 301-1 includes four delay units 31-1 to 34-1, five multipliers 40-1 to 44-1, and four adders 50-1 to 53-1 in which "−1" is added to the reference signs of the components of the FIR filter unit 301. In the adaptive equalizer 300b, as described above, the convolution operation is omitted by decreasing the number of pipelines, and accordingly, the FIR filter units 301-1 to 301-6 may not include a configuration corresponding to the switches 70 to 74. The FIR filter unit 301-1 and the FIR filter unit 301-4 may not execute convolution using the phase shift tap coefficient series vector P$_{nu}$.

The tap coefficient updating unit 95b calculates a digital signal equalization tap coefficient series vector h$_{qr}$ by performing an update operation set in advance on the basis of equalization signals S''$_j$ every 8 sampling periods corresponding to K×M (here, K×M=8), that is, the number of stages of pipelines. The tap coefficient updating unit 95b calculates a digital signal equalization/phase-shift tap coefficient series vector H$_{qrn}$ by executing a convolution operation of the calculated digital signal equalization tap coefficient series vector h$_{qr}$ and the phase shift tap coefficient series vector P$_{nu}$ using Equation (5). The tap coefficient updating unit 95b outputs the calculated digital signal equalization/phase-shift tap coefficient series vector H$_{qrn}$ to the multipliers 40-1 to 44-1, 40-2 to 44-2, 40-3 to 44-3, 40-4 to 44-4, 40-5 to 44-5, 40-6 to 44-6 included in the FIR filter units 301-1 to 301-6.

By applying the adaptive equalizer 300b described above, in addition to the effect of a decrease in the power consumption acquired by the adaptive equalizer 300, an effect of decreasing an operation time according to parallel execution of an equalization operation such as a convolution operation can be acquired. For example, in the adaptive equalizer 300b, for example, by disposing eight stages of pipelines, six convolution operations are executed in one process, and six received symbols are acquired.

In order to optimize the phase shift tap coefficient P$_{nu}$, the tap coefficient updating unit 95 may apply a window function to the phase shift tap coefficient P$_{nu}$. When the phase shift tap coefficient P$_{nu}$ is determined, a coefficient including a function of the window function, a function of a low pass filter, and a function of equalizing a distortion in the optical fiber transmission line 3 may be used as the phase shift tap coefficient P$_{nu}$.

(Another Configuration Example (2) of Second Embodiment)

Figure 13:
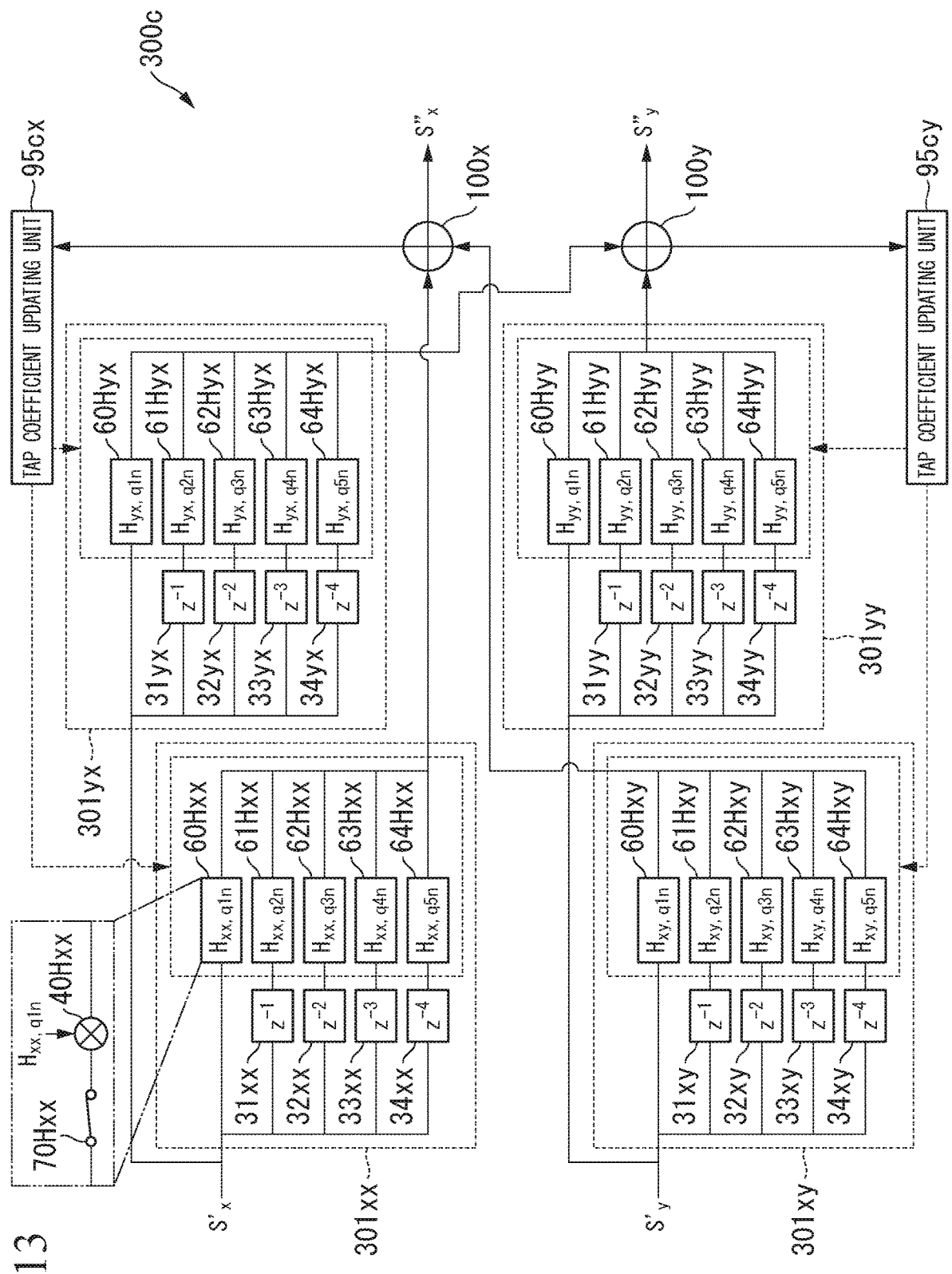
FIG. 13 is a diagram illustrating still another configuration example (2) according to the second embodiment.

FIG. 13 is a block diagram illustrating the configuration of an adaptive equalizer 300c according to another configuration example of the second embodiment. The same reference sign will be assigned to the same component as that according to the first embodiment, and, hereinafter, different components will be described. The adaptive equalizer 300c illustrated in FIG. 13 has a configuration of the FIR filter that is a so-called butterfly configuration applied in a case in which the optical modulation signal is a polarization multiplexed optical modulation signal. In a case in which the adaptive equalizer 300*c* is applied, the optical transmitter 2 illustrated in FIG. 6 transmits a polarization multiplexed optical modulation signal including two polarized waves including an X-polarized wave and a Y-polarized wave, and the polarization multiplexed optical modulation signal is transmitted through the optical fiber transmission line 3.

The optical coherent receiving unit 11 of the optical receiver 10*c* demodulates baseband signals of two polarized waves of the X polarized wave and the Y-polarized wave and outputs resultant signals to the analog-to-digital converter 12. The analog-to-digital converter 12 converts each of the baseband signals including the X-polarized wave and the Y-polarized wave into a digital signal of M/N (samples/symbol). Also in the example illustrated in FIG. 13, M=4, and N=3.

The wavelength dispersion compensator 20 performs a correction process for a digital signal including X-polarized waves with 4/3 (samples/symbol) and outputs a received digital signal series vector $S'_x$ of the X polarized waves. The wavelength dispersion compensator 20 performs a correction process for a digital signal of Y-polarized waves with 4/3 (samples/symbol) and outputs a received digital signal series vector $S'_y$ of the Y polarized waves. The two digital signal series vector of the received digital signal series vector $S'_x$ of the X-polarized waves and the received digital signal series vector $S'_y$ of the Y-polarized waves are complex digital signal series vectors. Each of the two digital signal series vectors $S'_x$ and $S'_y$ input to the adaptive equalizer 300*c* is composed of a digital signal of 4/3 (samples/symbol).

The adaptive equalizer 300*c* includes FIR filter units 301*xx*, 301*xy*, 301*yx*, and 301*yy*, tap coefficient updating units 95*cx* and 95*cy*, and adders 100*x* and 100*y*. Each of the FIR filter units 301*xx*, 301*xy*, 301*yx*, and 301*yy* has a configuration corresponding to that of the FIR filter unit 301 illustrated in FIG. 7. The delay units 31*xx* to 34*xx*, 31*xy* to 34*xy*, 31*yx* to 34*yx*, and 31*yy* to 34*yy* respectively correspond to the delay units 31 to 34 of the FIR filter unit 301.

The FIR filter units 301*xx*, 301*xy*, 301*yx*, and 301*yy* respectively include tap coefficient calculating units 60Hxx to 64Hxx, 60Hxy to 64Hxy, 60Hyx to 64Hyx, and 60Hyy to 64Hyy including a configuration corresponding to the switches 70 to 74 and the multipliers 40 to 44 of the FIR filter unit 301. FIG. 13 illustrates the configuration of the tap coefficient calculating unit 60Hxx as one example. As illustrated in FIG. 13, the tap coefficient calculating unit 60Hxx includes a switch 70Hxx corresponding to the switch 70 of the FIR filter unit 301 and a multiplier 40Hxx corresponding to the multiplier 40.

In FIG. 13, a digital signal equalization/phase-shift tap coefficient $H_{xx,q1n}$ illustrated within a rectangular line diagram of the tap coefficient calculating unit 60Hxx represents a digital signal equalization/phase-shift tap coefficient output to the multiplier 40Hxx of the FIR filter unit 301*xx*. Similarly, digital signal equalization/phase-shift tap coefficients $H_{xx,q2n}$, $H_{xx,q3n}$, $H_{xx,q4n}$, and $H_{xx,q5n}$ illustrated within rectangular line diagrams of the tap coefficient calculating units 61Hxx to 64Hxx are respectively the digital signal equalization/phase-shift tap coefficients output to the multipliers 41Hxx to 44Hxx of the FIR filter unit 301*xx*.

For example, a digital signal series vector $S'_x$ of X-polarized waves is represented as $(S'_{x,i-4}, S'_{x,i-3}, S'_{x,i-2}, S'_{x,i-1}, S'_{x,i})$ in the case of R=5. The multiplier 40Hxx of the FIR filter unit 301*xx* calculates and outputs a value of a product acquired by multiplying the digital signal equalization/phase-shift tap coefficient $H_{xx,q1n}$ by the digital signal $S'_{x,i}$. Similar to the multiplier 40Hxx, the multipliers 41Hxx to 44Hxx respectively multiply $H_{xx,q2n}$ by $S'_{x,i-1}$, $H_{xx,q3n}$ by $H_{xx,q4n}$ by $S'_{x,i-3}$, and $H_{xx,q5n}$ by $S'_{x,i-4}$. In accordance with such multiplication, in the FIR filter unit 301*xx*, a convolution operation of the digital signal equalization/phase-shift tap coefficient series vector $H_{xx,qrn}$ and the received digital signal series vector $S'_x$ of X-polarized waves is executed.

Similar to the FIR filter unit 301*xx*, the FIR filter unit 301*xy* executes a convolution operation of the digital signal equalization/phase-shift tap coefficient series vector $H_{xy,qrn}$ and the received digital signal series vector $S'_y$ of Y-polarized waves. The FIR filter unit 301*yx* executes a convolution operation of the digital signal equalization/phase-shift tap coefficient series vector $H_{yx,qrn}$ and the received digital signal series vector $S'_x$ of X-polarized waves. The FIR filter unit 301*yy* executes a convolution operation of the digital signal equalization/phase-shift tap coefficient series vector $H_{yy,qrn}$ and the received digital signal series vector $S'_y$ of Y-polarized waves.

The adder 100*x* adds values of products output by the multipliers 40Hxx to 44Hxx and the multipliers 40Hxy to 44Hxy respectively included in the FIR filter unit 301*xx* and the FIR filter unit 301*xy* and calculates an equalization signal $S''_x$ of 1 (samples/symbol), in other words, a received symbol $S_x$. The adder 100*y* adds values of products output by the multipliers 40Hyx to 44Hyx and the multipliers 40Hyy to 44Hyy respectively included in the FIR filter unit 301*yx* and the FIR filter unit 301*yy* and calculates an equalization signal $S''_y$ of 1 (samples/symbol), in other words, a received symbol $S_y$.

The tap coefficient updating units 95*cx* and 95*cy* respectively calculate the digital signal equalization tap coefficients $h_{xx,qr}$ and $h_{yx,qr}$ and the digital signal equalization tap coefficients $h_{xy,qr}$ and $h_{yy,qr}$ on the basis of update operations set in advance using the equalization signal $S''_x$ and the equalization signal $S''_y$ once every K×M (here, K×4) sampling periods (here, K is a positive integer).

The tap coefficient updating unit 95*cx* calculates digital signal equalization/phase-shift tap coefficient series vectors $H_{xx,qrn}$ and $H_{yx,qrn}$ by executing convolution operations of the calculated digital signal equalization tap coefficient series vectors $h_{xx,qr}$ and $h_{yx,qr}$ and the phase shift tap coefficient series vector $P_{nu}$ represented in Equation (5). The tap coefficient updating unit 95*cx* outputs the calculated digital signal equalization/phase-shift tap coefficient series vectors $H_{xx,qrn}$ and $H_{yx,qrn}$ respectively to the multipliers 40Hxx to 44Hxx and 40Hyx to 44Hyx of the FIR filter units 301*xx* and 301*yx*.

Similar to the tap coefficient updating unit 95*cx*, the tap coefficient updating unit 95*cy* calculates digital signal equalization/phase-shift tap coefficient series vectors $H_{xy,qrn}$ and $H_{yy,qrn}$ by executing convolution operations of the calculated digital signal equalization tap coefficient series vectors $h_{xy,qr}$ and $h_{yy,qr}$ and the phase shift tap coefficient series vector $P_{nu}$ represented in Equation (5). The tap coefficient updating unit 95*cy* outputs the calculated digital signal equalization/phase-shift tap coefficient series vectors $H_{xy,qrn}$ and $H_{yy,qrn}$ respectively to the multipliers 40Hxy to 44Hxy and 40Hyy to 44Hyy of the FIR filter units 301*xy* and 301*yy*.

The adaptive equalizer 300*c*, similar to the adaptive equalizer 300, can omit convolution operations using the FIR filter units 301*xx*, 301*xy*, 301*yx*, and 301*yy* the number of times corresponding to a difference (M−N) between M and N every M sampling periods. Here, since M=4 and N=3, and a value of the remainder, i.e., (4 mod 3)=1, the adaptive equalizer 300*c* can omit a convolution operation once every four sampling periods. In the FIR filter units 301*xx*, 301*yx*, 301xy, and 301yy, the switches 70Hxx to 74Hxx, 70Hyx to 74Hyx, 70Hxy to 74Hxy, and 70Hyy to 74Hyy included in the tap coefficient calculating units 60Hxx to 64Hxy, 60Hxy to 64Hxy, 60Hyx to 64Hyx, and 60Hyy to 64Hyy become in the off state at timings when the convolution operation is omitted.

The adaptive equalizer 300c, similar to the adaptive equalizer 300, may omit a convolution operation at an arbitrary timing within M sampling periods. In the first phase shift tap coefficient $P_{1u}$ (in the case of n=1) in M sampling periods, an equalization signal $S''_j$ acquired by executing a convolution operation of the digital signal equalization tap coefficient series vectors $h_{xx,qr}$, $h_{yx,qr}$, $h_{xy,qr}$, and $h_{yy,qr}$ and the received digital signal series vector S' directly becomes the received symbol $S_j$. In other words, the sampling timing of the received digital signal $S'_i$ and the symbol timing of the received symbol $S_j$ coincide with each other. For this reason, the adaptive equalizer 300c may execute only the convolution operation represented in Equation (3) that is the same as the first embodiment without executing the operation represented in Equation (6) convoluting the phase shift tap coefficient series vector $P_{nu}$. In this way, the adaptive equalizer 300c can decrease the amount of calculation.

By applying the adaptive equalizer 300c described above, an equalization operation can be executed for a polarization multiplexed optical modulation signal using the digital signal equalization/phase-shift tap coefficient series vector $H_{qrn}$ convoluted with the phase shift tap coefficient $P_{nu}$ in advance. In accordance this equalization operation, the adaptive equalizer 300c can acquire equalization signals $S''_x$ and $S''_y$ of 1 (samples/symbol), in other words, received symbols $S_x$ and $S_y$ from the digital signal of which the number of samples per symbol is 4/3 for each of the X-polarized waves and the Y-polarized waves. For this reason, it is not necessary to form a digital signal of 2 (samples/symbol) through up-sampling before outputting a digital signal to the adaptive equalizer 300c, and accordingly, the optical receiver can achieve a decrease in the power consumption of the adaptive equalizer 300c.

The adaptive equalizer 300c illustrated in FIG. 13 has a configuration in which all the values of products output from the tap coefficient calculating units 60Hxx to 64Hxx and the tap coefficient calculating units 60Hxy to 64Hxy are added by the adder 100x without having components corresponding to the adders 50 to 53 of the FIR filter unit 301. The adaptive equalizer 300c has a configuration in which all the values of products output from the tap coefficient calculating units 60Hyx to 64Hyx and the tap coefficient calculating units 60Hyy to 64Hyy are added by the adder 100y. However, the configuration of the present invention is not limited to this embodiment, and, similar to the adders 50 to 53 of the FIR filter unit 301, for example, the adaptive equalizer 300c may include an adder at output terminals of the tap coefficient calculating units 60Hxx to 64Hxx of the FIR filter unit 301xx. The adder may add products output by the tap coefficient calculating units 60Hxx to 64Hxx and output a result of the addition to the adder 100x.

As the FIR filter units 301xx, 301yx, 301xy, 301yy, the FIR filter unit 301a illustrated in FIG. 10 may be applied instead of the FIR filter unit 301 illustrated in FIG. 7.

In the first and second embodiments described above, although an example in which M=4 and N=3 has been described, the configuration of the present invention is not limited to these embodiments. As M and N, a combination of certain values may be used, as long as M and N are positive integers, M/N is not an integer, and a relationship of M>N is satisfied.

In the first embodiment described above, down-sampling is performed using a technique of execution of thinning-out in M periods after N over-sampling by the sample rate converter 400, where M=4 and N=3. However, the configuration of the present invention is not limited to this embodiment. Other than the technique described above, the down-sampling may be executed in a compensation process based on an arbitrary technique. For example, a compensation process using a polynomial or an FIR filter to which the phase shift tap coefficient series vector $P_{nu}$ applied in the second embodiment may be applied to the equalization signal $S''_i$.

In the first and second embodiments described above, the update operation set in advance that is executed for the digital signal equalization tap coefficients $h_{qr}$, $h_{xx,qr}$, $h_{xy,qr}$, $h_{yx,qr}$, and $h_{yy,qr}$ by the tap coefficient updating units 90, 90a, 90bx, 90by, 95, 95b, 95cx, and 95cy, for example is an operation to which an algorithm such as a constant modulus algorithm (CMA) or a decision directed least mean square (DD-LMS) is applied and may be an operation to which an arbitrary algorithm other than these is applied.

In the first and second embodiments described above, as a configuration of the equalization operation executed in the adaptive equalizers 200, 200a, 200b, 300, 300a, 300b, and 300c, the convolution operation has been applied and described. However, the configuration of the present invention is not limited to these embodiments. Since a convolution operation in the time domain is multiplication in the frequency domain, an equalization operation of multiplying a value acquired by executing a fast Fourier transform of a received digital signal by a value acquired by executing an FFT of the digital signal equalization tap coefficient series vector $h_{qr}$ or the digital signal equalization/phase-shift tap coefficient series vector $H_{qrn}$ may be performed.

Each of the adaptive equalizer 200b according to the first embodiment and the adaptive equalizer 300c according to the second embodiment described above has a polarization multiplexed optical modulation signal as its target. Each of the adaptive equalizers 200b and 300c has a configuration in which complex digital signals of two outputs are acquired for complex digital signals of two inputs, in other words, a configuration of the 2×2 butterfly filter illustrated in FIGS. 5 and 13. However, the configuration of the present invention is not limited to this embodiment, and a configuration acquired by expanding the adaptive equalizers 200b and 300c may be applied also to a spatially multiplexed signal having more number of multiplexes. For example, in order to independently equalize an IQ lane of a complex digital signal or equalize a multi-carrier signal, a spatially multiplexed signal and the like, a configuration of a butterfly filter having an arbitrary number of stages may be applied to the adaptive equalizers 200b and 300c.

In addition, the configurations of the digital signal processing units 13 and 13c according to the first and second embodiments are merely examples, and an arbitrary compensator such as a non-linear optical effect compensator may be included.

Third Embodiment

In the first and second embodiments, a configuration has been illustrated in which the equalization operation is executed for a digital signal having the number of samples maintained as M/N (samples/symbol). The equalization operation uses the digital signal equalization tap coefficients of which values are updated every predetermined sampling period such as a K×M sampling period. In a third embodiment, a configuration in which digital signal equalization tap coefficients are updated not in a constant sampling period but in an arbitrary sampling period will be described.

Figure 14:
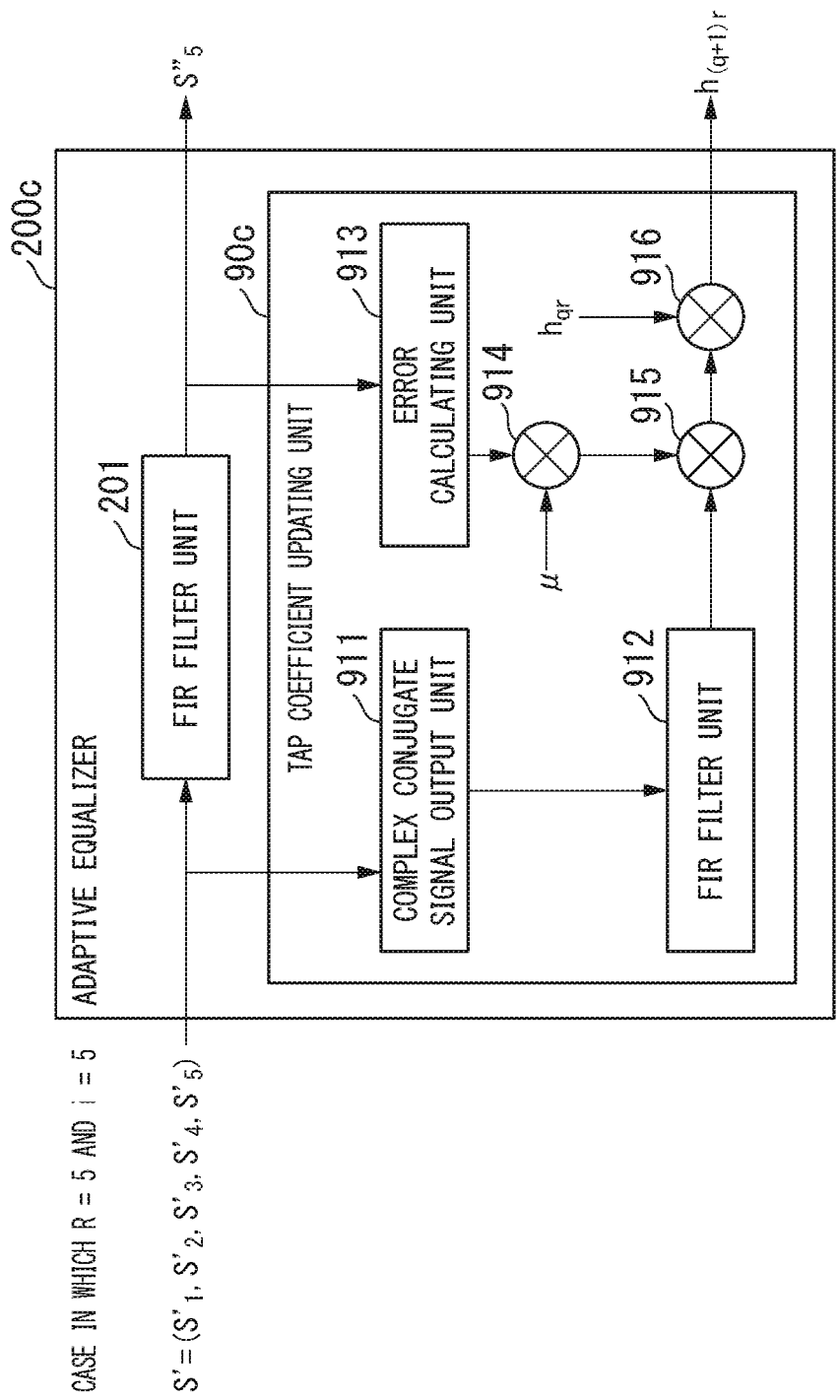
FIG. 14 is a block diagram illustrating a configuration of an adaptive equalizer according to a third embodiment.

FIG. 14 is a block diagram illustrating the configuration of the adaptive equalizer 200c according to the third embodiment. The adaptive equalizer 200c has a configuration for executing a convolution operation and includes an FIR filter unit 201 and a tap coefficient updating unit 90c. The FIR filter unit 201, for example, performs the same as that performed by a functional unit having the same name illustrated in FIG. 2. The tap coefficient updating unit 90c updates the digital signal equalization tap coefficient series vector $h_{qr}$ in an arbitrary sampling period by executing a convolution operation of the phase shift tap coefficient with the digital signal when the digital signal equalization tap coefficients $h_{q1}$, $h_{q2}$, ... $h_{qr}$ are updated. In a case in which a phase shift tap coefficient $P_{1u}$ is used, the tap coefficient updating unit 90c may omit the convolution operation.

The tap coefficient updating unit 90c includes a complex conjugate signal output unit 911, an FIR filter unit 912, an error calculating unit 913, a multiplier 914, a multiplier 915, and an adder 916. A received digital signal series vector S' including digital signals continuous in a time series is output to the complex conjugate signal output unit 911. The complex conjugate signal output unit 911 outputs a complex conjugate of each digital signal that has been input. The complex conjugate signal output unit 911 outputs a complex conjugate of each digital signal that has been acquired to the FIR filter unit 912. The FIR filter unit 912 calculates (S'$P_{nu}$) by executing a convolution operation of the phase shift tap coefficient series vector $P_{nu}$ and a complex conjugate of each digital signal acquired by the complex conjugate signal output unit 911. The FIR filter unit 912 outputs the digital signal (S'$P_{nu}$) acquired through the convolution operation to the multiplier 915.

The error calculating unit 913 inputs the equalization signal S''$_i$ output by the FIR filter unit 201. The error calculating unit 913 executes error calculation by applying an arbitrary tap update algorithm using a cost function c(S) to the equalization signal S''$_i$. For example, the error calculating unit 913 executes error calculation using an algorithm such as the CMA or the DD-LMS.

The multiplier 914 multiplies a predetermined coefficient μ by an error ε(S) output by the error calculating unit 913. The multiplier 914 outputs a value με(S) that is a result of the multiplication to the multiplier 915. The multiplier 915 multiplies the value με(S) that is the result of the multiplication output from the multiplier 914 by a digital signal (S'$P_{nu}$) after the convolution operation that is output from the FIR filter unit 912. The multiplier 915 outputs the value με(S)(S'$P_{nu}$) that is the result of the multiplication to the adder 916. The adder 916 adds the digital signal με(S)(S'**$P_{nu}$) output from the multiplier 915 and the digital signal equalization tap coefficient series vector $h_{qr}$, thereby calculating a digital signal equalization tap coefficient $h_{(q+1)r}$ after update. In this way, the adder 906 updates the digital signal equalization tap coefficient series vector $h_{qr}$. The adder 916 outputs the digital signal equalization tap coefficient $h_{(q+1)r}$ after the update to the FIR filter unit 201.

Figure 15:
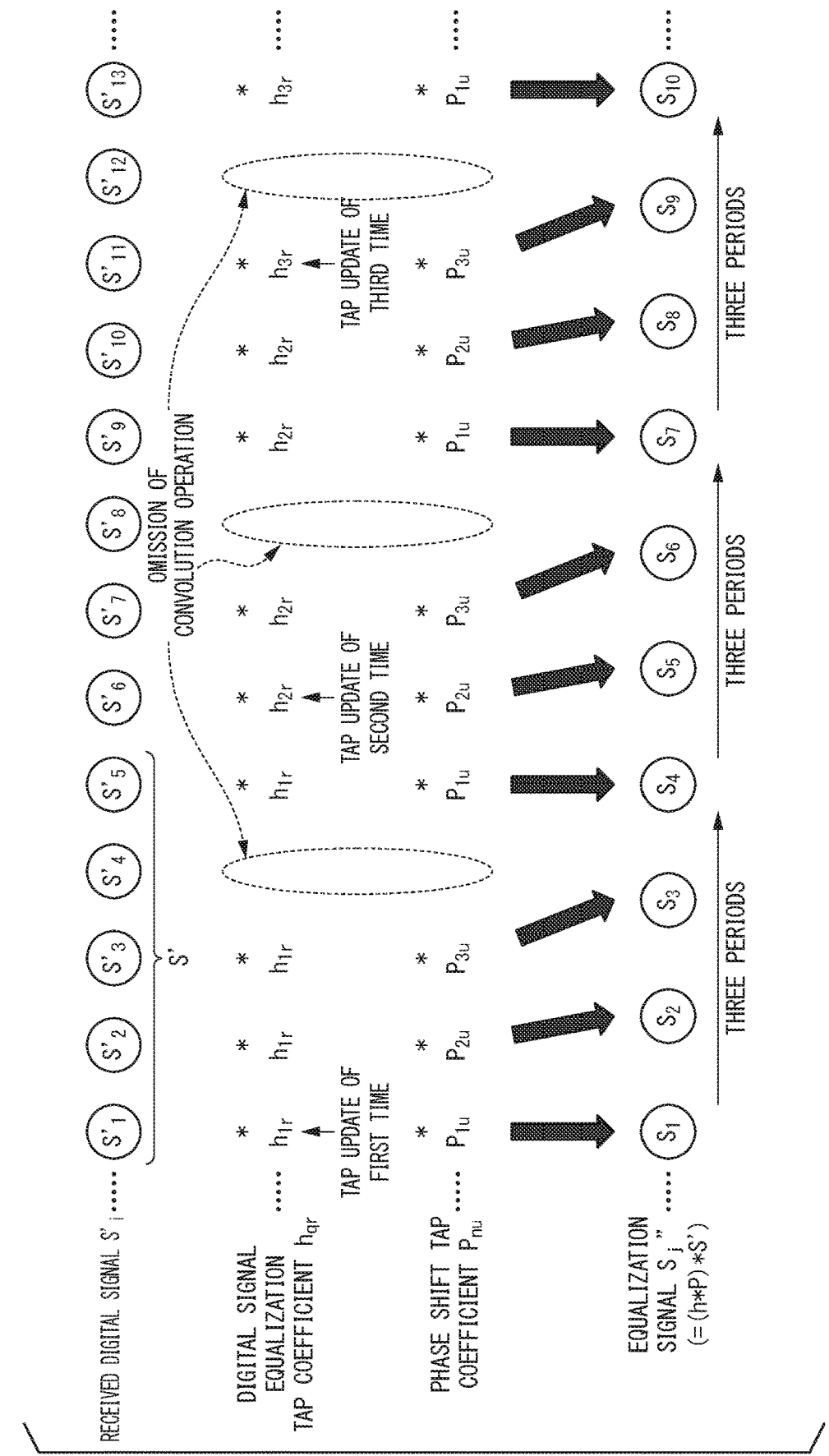
FIG. 15 is a diagram illustrating a process performed by an adaptive equalization processing unit according to the third embodiment.

The flow of a process executed by the adaptive equalizer 200c according to the third embodiment is illustrated in FIG. 15. The adaptive equalizer 200c according to the third embodiment, as illustrated in FIG. 15, updates the digital signal equalization tap coefficient series vector $h_{qr}$ in an arbitrary sampling period.

As described above, the adaptive equalizer 200c according to the third embodiment executes a convolution operation of the phase shift tap coefficient $P_{nu}$ and the input received digital signal series vector S'. By executing a convolution operation of the phase shift tap coefficient $P_{nu}$ and the received digital signal series vector S', even in a case in which there is a difference in timing between the digital signal equalization tap coefficient series vector $h_{qr}$ and the received symbol $S_j$, an appropriate equalization signal can be acquired. For this reason, the adaptive equalizer 200c can update the digital signal equalization tap coefficient series vector $h_{qr}$ at an arbitrary timing. Accordingly, the optical receiver can quickly execute tap update in accordance with the state of an optical modulation signal, a baseband signal, or a received digital signal, and signal reception with a high accuracy using an appropriate digital signal equalization tap coefficient at all times can be achieved.

In the first and second embodiment, since a method in which the digital signal equalization tap coefficient series vector $h_{qr}$ is updated with a first sample in M sampling periods is used, the process of the first sample cannot be omitted. In contrast to this, the adaptive equalizer 200c according to the third embodiment can update the digital signal equalization tap coefficient series vector $h_{qr}$ at an arbitrary timing, and accordingly, a process in which a process of the first sample is omitted, and a received symbol is calculated in the process of the remaining samples can be performed. In this way, the adaptive equalizer 200c can decrease the amount of calculation.

(Another Configuration Example of Third Embodiment)

Figure 16:
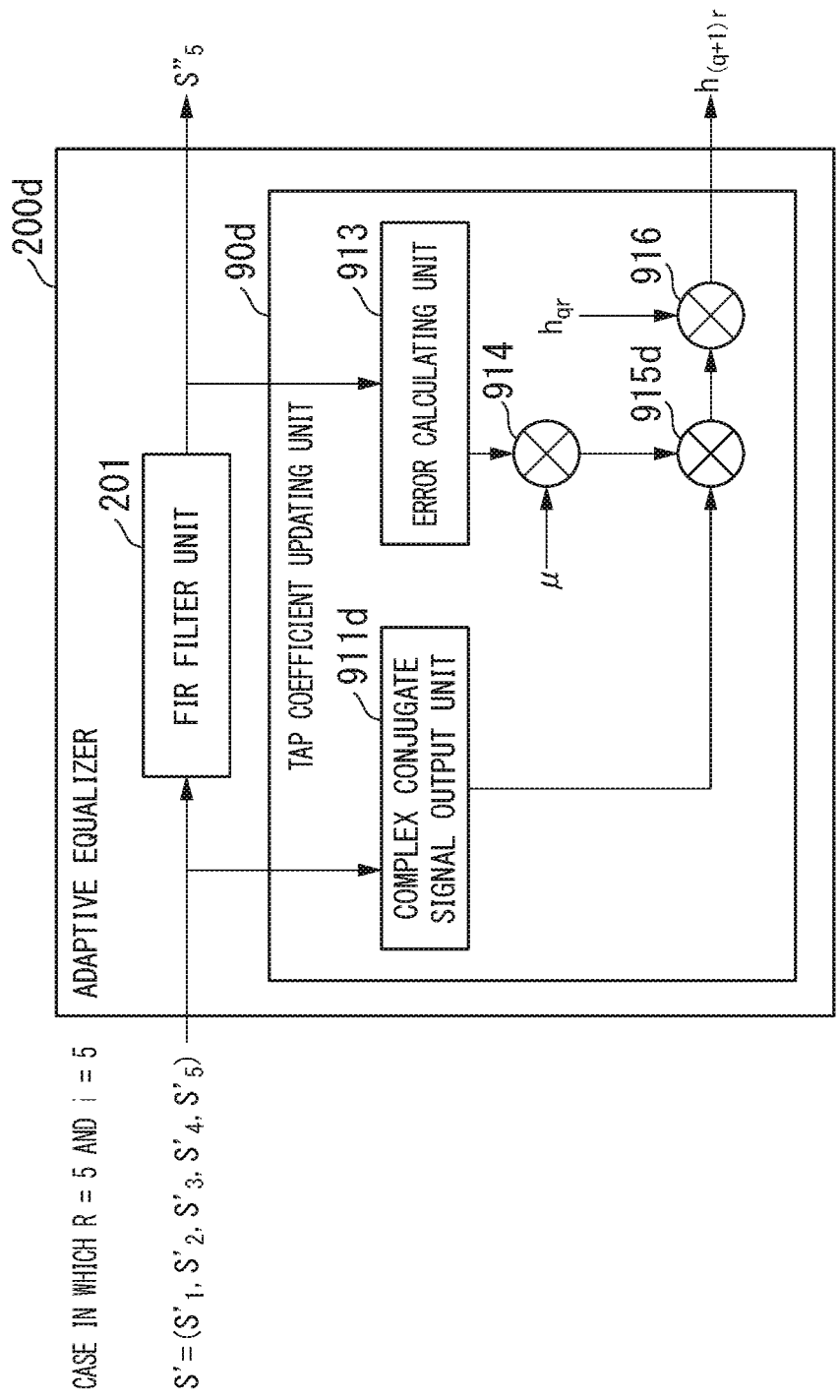
FIG. 16 is a block diagram illustrating the configuration of an adaptive equalizer in another configuration example according to the third embodiment.
Figure 17:
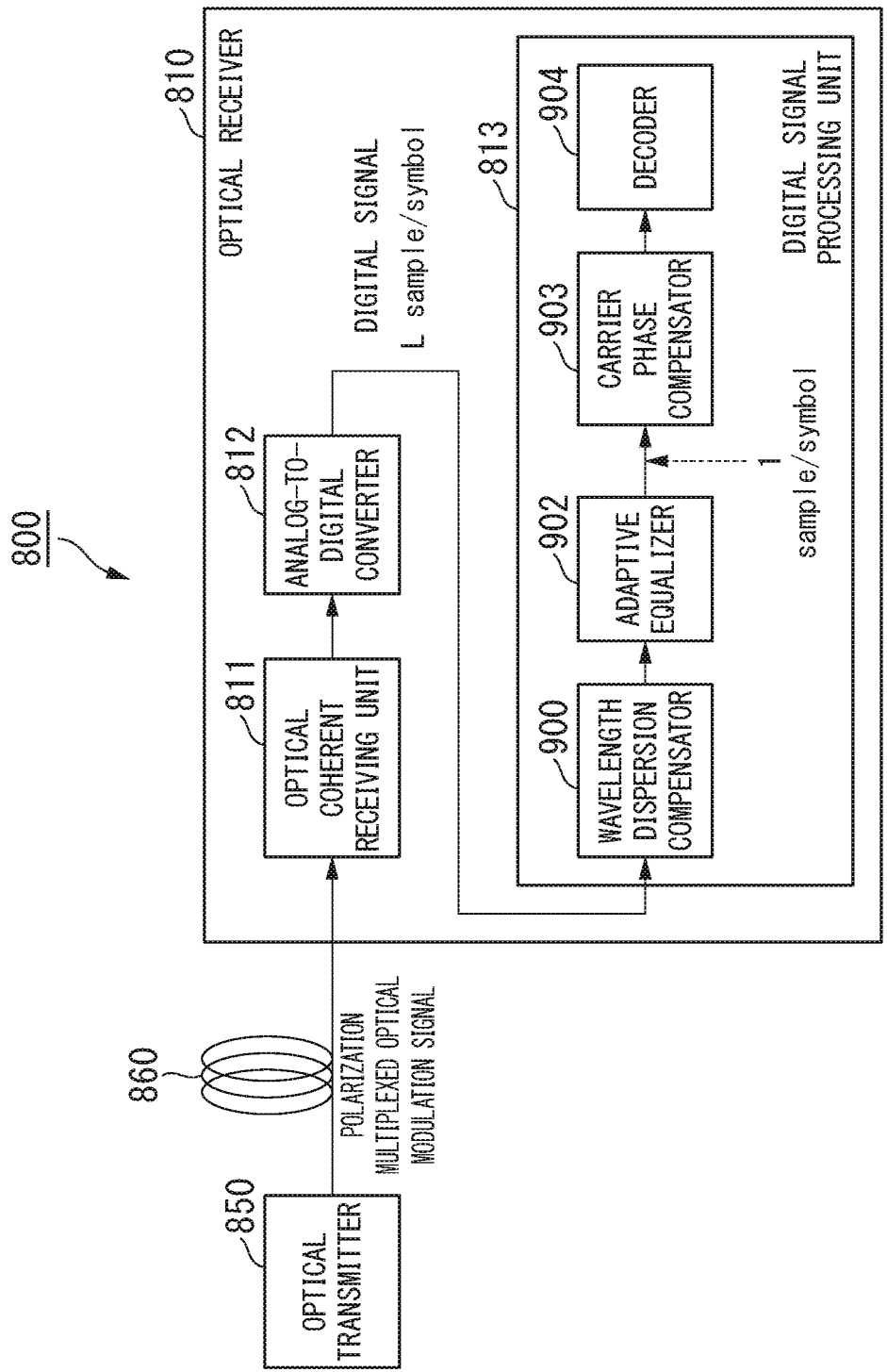
FIG. 17 is a diagram illustrating a configuration (1) of a conventional optical communication system.
Figure 18:
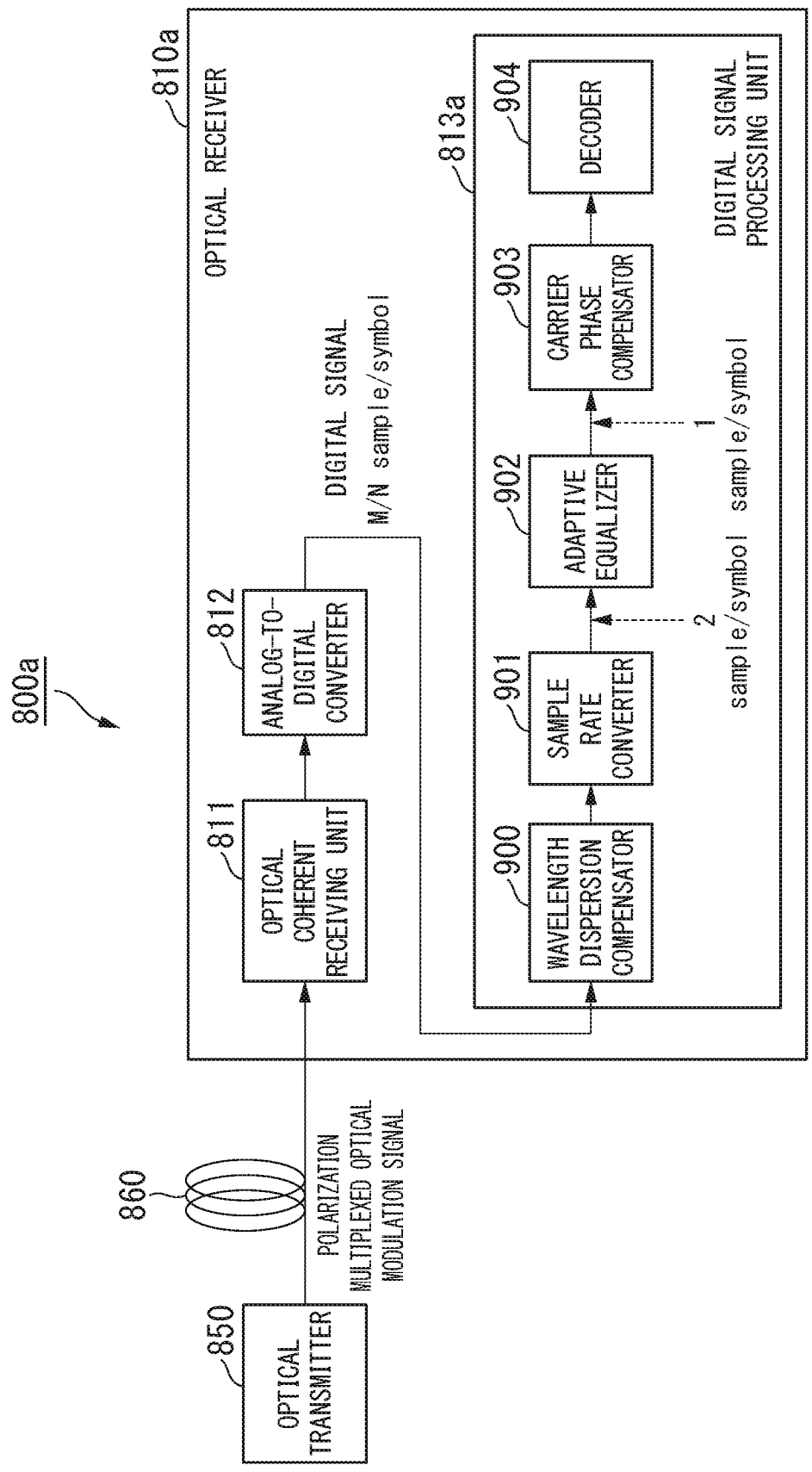
FIG. 18 is a diagram illustrating another configuration (2) of a conventional optical communication system.

FIG. 16 is a block diagram illustrating the configuration of an adaptive equalizer 200d according to another configuration example of the third embodiment. The adaptive equalizer 200d illustrated in FIG. 16 is different from the adaptive equalizer 200c illustrated in FIG. 14 in that a tap coefficient updating unit 90d is included instead of the tap coefficient updating unit 90c. The tap coefficient updating unit 90d includes a complex conjugate signal output unit 911d, an error calculating unit 913, multipliers 914 and 915d, and an adder 916. As illustrated in FIG. 16, the tap coefficient updating unit 90d has a configuration different from that of the tap coefficient updating unit 90c in which the FIR filter unit 912 is not included, and a complex conjugate signal output unit 911d and a multiplier 915d are included instead of the complex conjugate signal output unit 911 and the multiplier 915. Hereinafter, only differences from the adaptive equalizer 200c illustrated in FIG. 14 will be described.

A received digital signal series vector S' including digital signals continuous in a time series is output to the complex conjugate signal output unit 911d. The complex conjugate signal output unit 911d acquires a complex conjugate of each digital signal that has been input. The complex conjugate signal output unit 911d outputs the complex conjugate of each acquired digital signal to the multiplier 915d. The multiplier 915d multiplies a value με(S) of a result of the multiplication output from the multiplier 914 by the complex conjugate of the digital signal output from the complex conjugate signal output unit 911d. The multiplier 915d outputs the value με(S)(S'*$_{k+an}$) of the result of the multiplication to the adder 916.

As described above, in the adaptive equalizer 200d according to the third embodiment, by executing a convolution operation of the phase shift tap coefficient $P_{nu}$ after updating the common digital signal equalization tap coefficient series vector $h_{qr}$, the digital signal equalization/phase-shift tap coefficient series vector $H_{qrn}$ is updated. By contrast, in another configuration example of the third embodiment described above, the digital signal equalization/phase-shift tap coefficient series vector $H_{qrn}$ is directly updated. By employing this configuration, the adaptive equalizer 200d can directly update the digital signal equalization/phase-shift tap coefficient series vector $H_{qrn}$ and use it for signal equalization without executing a convolution operation ($H_{qrn}=h_{qr}*P_{nu}$).

In a case in which the digital signal equalization tap coefficient series vector $h_{qr}$ is updated at the first time of M sampling periods (in a case in which periods of a sample and a symbol coincide with each other), a timing at which the digital signal equalization/phase-shift tap coefficient series vector $H_{qrn}$ can be updated in each period is limited. In a case in which the digital signal equalization/phase-shift tap coefficient series vector $H_{qrn}$ is directly updated at an arbitrary timing, it can be updated each time, and accordingly, can be quickly updated to an appropriate digital signal equalization tap coefficient in accordance with the state of the signal.

In the third embodiment and the another configuration example of the third embodiment, although a case in which the configuration of the FIR filter unit 201 inside the adaptive equalizer 200c is the same as the configuration of the FIR filter unit illustrated in FIG. 2 has been described as an example, the present invention is not limited thereto. For example, the FIR filter units illustrated in FIGS. 4, 5, 7, and 9 to 13 may be applied to the tap coefficient updating unit 90c and the tap coefficient updating unit 90d according to the third embodiment and another configuration example of the third embodiment.

In order to optimize the phase shift tap coefficient $P_{nu}$, the tap coefficient updating units 90c and 90d may apply a window function to the phase shift tap coefficient $P_{nu}$. When the phase shift tap coefficient $P_{nu}$ is determined, a coefficient including a function of the window function, a function of a low pass filter, a function for equalizing a distortion in the optical fiber transmission line 3, and the like may be used as the phase shift tap coefficient $P_{nu}$.

The tap update according to the first and second embodiments may be configured to be executed using the tap coefficient updating unit 90d illustrated in FIG. 16. The reason for this is that, in the case of a method in which the digital signal equalization tap coefficient series vector $h_{qr}$ is updated at the first time of the M sampling periods, the digital signal equalization/phase-shift tap coefficient series vector $H_{qrn}$ and the digital signal equalization tap coefficient series vector $h_{qr}$ coincide with each other, and accordingly, the digital signal equalization tap coefficient series vector $h_{qr}$ can be appropriately updated without execution of convolution of the $P_{nu}$ and the received digital signal series vector S'.

The optical receivers 10 and 10c according to the first, second, and third embodiments described above may be realized using a computer. In such a case, by recording a program used for realizing this function on a computer-readable recording medium and causing a computer system to read and execute the program recorded on this recording medium, the control function may be realized. The "computer system" described here includes an OS and hardware such as peripherals. The "computer-readable recording medium" represents a portable medium such as a flexible disc, a magneto-optical disk, a ROM, or a CD-ROM or a storage device such as a hard disk built in the computer system. The "computer-readable recording medium" may include a medium that dynamically maintains a program for a short time such as a communication line of a case in which a program is transmitted through a network such as the Internet or a communication circuit line such a telephone circuit line and a medium that maintains a program for a predetermined time such as a volatile memory of the inside of a computer system serving as a server or a client in such a case. In addition, the program described above may be a program used for realizing a part of the function described above or a program to be combined with a program that has already been recorded in the computer system for realizing the function described above and may be realized using a programmable logic device such as a field programmable gate array (FPGA).

As above, while one embodiment of the present invention has been described in detail with reference to the drawings, a specific configuration is not limited to that described above, and various design changes and the like may be made in a range not departing from the concept of the present invention.

INDUSTRIAL APPLICABILITY

The present invention can be applied to a use in which a decrease in power consumption is required in the process of a reception side using an adaptive equalizer for digital signals.

REFERENCE SIGNS LIST

1 Optical communication system
2 Optical transmitter
3 Optical fiber transmission line
10 Optical receiver
11 Optical coherent receiving unit
12 Analog-to-digital converter
13 Digital signal processing unit
20 Wavelength dispersion compensator
21 Adaptive equalization processing unit
22 Carrier phase compensator
23 Decoder
200 Adaptive equalizer
400 Sample rate converter

The invention claimed is:

1. An optical receiver that demodulates an optical modulation signal into a baseband signal, which is an electrical signal, and decodes a received symbol acquired by converting the baseband signal, the optical receiver comprising:
an analog-to-digital converter that converts the baseband signal into a digital signal of which the number of samples per received symbol is M/N (samples/symbol), M and N being positive integers, M/N being not an integer, and "M>N" being satisfied; and
an adaptive equalization processing unit that executes an equalization operation set in advance to output the received symbol on a basis of the digital signal of which the number of samples per received symbol is M/N (samples/symbol) and at least one tap coefficient used for equalization of a signal, the at least one tap coefficient being updated in any sampling period, wherein the adaptive equalization processing unit includes:
an adaptive equalizer that calculates an equalization signal of which the number of samples per symbol is M/N (samples/symbol) by executing the equalization operation on a basis of the digital signal of which the number of samples per received symbol is M/N (samples/symbol) and the at least one tap coefficient; and
a sample rate converter that executes down-sampling of the equalization signal of which the number of samples per received symbol is M/N (samples/symbol) to output the received symbol.

2. An optical receiver that demodulates an optical modulation signal into a baseband signal, which is an electrical signal, and decodes a received symbol acquired by converting the baseband signal, the optical receiver comprising:
an analog-to-digital converter that converts the baseband signal into a digital signal of which the number of samples per received symbol is M/N (samples/symbol), M and N being positive integers, M/N being not an integer, and "M>N" being satisfied; and
an adaptive equalization processing unit that executes an equalization operation set in advance to output the received symbol on a basis of the digital signal of which the number of samples per received symbol is M/N (samples/symbol) and at least one tap coefficient used for equalization of a signal, the at least one tap coefficient being updated in any sampling period,
wherein the at least one tap coefficient includes digital signal equalization tap coefficients, and
wherein the adaptive equalization processing unit includes:
an adaptive equalizer that calculates an equalization signal of 1 (samples/symbol) by executing the equalization operation on a basis of the digital signal of which the number of samples per received symbol is M/N (samples/symbol) and the digital signal equalization tap coefficients of N series and outputs the calculated equalization signal as the received symbol.

3. An optical receiver that demodulates an optical modulation signal into a baseband signal, which is an electrical signal, and decodes a received symbol acquired by converting the baseband signal, the optical receiver comprising:
an analog-to-digital converter that converts the baseband signal into a digital signal of which the number of samples per received symbol is M/N (samples/symbol), M and N being positive integers, M/N being not an integer, and "M>N" being satisfied; and
an adaptive equalization processing unit that executes an equalization operation set in advance to output the received symbol on a basis of the digital signal of which the number of samples per received symbol is M/N (samples/symbol) and at least one tap coefficient used for equalization of a signal, the at least one tap coefficient being updated in any sampling period,
wherein the at least one tap coefficient includes a digital signal equalization tap coefficient, and
wherein the adaptive equalization processing unit includes
an adaptive equalizer that calculates an equalization signal of 1 (samples/symbol) by executing the equalization operation on a basis of the digital signal of which the number of samples per received symbol is M/N (samples/symbol), the digital signal equalization tap coefficient, and a phase shift tap coefficient of N series set in advance and outputs the calculated equalization signal as the received symbol.

4. The optical receiver according to claim 3,
wherein the adaptive equalization processing unit updates the digital signal equalization tap coefficient in any sampling period by executing a convolution operation of the phase shift tap coefficient and the digital signal.

5. The optical receiver according to claim 3,
wherein the adaptive equalizer executes the equalization operation N times every M sampling periods to output the received symbol.

6. The optical receiver according to claim 5,
wherein the adaptive equalizer calculates the equalization signal on a basis of the digital signal of which the number of samples per received symbol is M/N (samples/symbol) and the digital signal equalization tap coefficient without applying the phase shift tap coefficient in the equalization operation of a first time every M sampling periods and outputs the calculated equalization signal as the received symbol.

7. An optical reception method of demodulating an optical modulation signal into a baseband signal, which is an electrical signal, and decoding a received symbol acquired by converting the baseband signal, the optical reception method comprising:
converting the baseband signal into a digital signal of which the number of samples per received symbol is M/N (samples/symbol), M and N being positive integers, M/N being not an integer, and "M>N" being satisfied; and
executing an equalization operation set in advance to output the received symbol on a basis of the digital signal of which the number of samples per received symbol is M/N (samples/symbol) and at least one tap coefficient used for equalization of a signal, the at least one tap coefficient being updated in any sampling period,
wherein the executing step comprises
calculating an equalization signal of which the number of samples per symbol is M/N (samples/symbol) by executing the equalization operation on a basis of the digital signal of which the number of samples per received symbol is M/N (samples/symbol) and the at least one tap coefficient, and
executing down-sampling of the equalization signal of which the number of samples per received symbol is M/N (samples/symbol) to output the received symbol.

8. An optical communication system comprising:
an optical transmitter that transmits an optical modulation signal; and
an optical receiver that receives the optical modulation signal, demodulates the optical modulation signal into a baseband signal that is an electrical signal, and decodes a received symbol acquired by converting the baseband signal,
wherein the optical receiver includes:
an analog-to-digital converter that converts the baseband signal into a digital signal of which the number of samples per received symbol is M/N (samples/symbol), M and N being positive integers, M/N being not an integer, and "M>N" being satisfied; and
an adaptive equalization processing unit that executes an equalization operation set in advance to output the received symbol on a basis of the digital signal of which the number of samples per received symbol is M/N (samples/symbol) and at least one tap coefficient used for equalization of a signal, the at least one tap coefficient being updated in any sampling period,
wherein the adaptive equalization processing unit includes:
an adaptive equalizer that calculates an equalization signal of which the number of samples per symbol is M/N (samples/symbol) by executing the equalization operation on a basis of the digital signal of which the number of samples per received symbol is M/N (samples/symbol) and the at least one tap coefficient; and a sample rate converter that executes down-sampling of the equalization signal of which the number of samples per received symbol is M/N (samples/symbol) to output the received symbol.

9. An optical reception method of demodulating an optical modulation signal into a baseband signal, which is an electrical signal, and decoding a received symbol acquired by converting the baseband signal, the optical reception method comprising:

converting the baseband signal into a digital signal of which the number of samples per received symbol is M/N (samples/symbol), M and N being positive integers, M/N being not an integer, and "M>N" being satisfied; and executing an equalization operation set in advance to output the received symbol on a basis of the digital signal of which the number of samples per received symbol is M/N (samples/symbol) and at least one tap coefficient used for equalization of a signal, the at least one tap coefficient being updated in any sampling period, wherein the at least one tap coefficient includes digital signal equalization tap coefficients, and wherein the executing step comprises
calculating an equalization signal of 1 (samples/symbol) by executing the equalization operation on a basis of the digital signal of which the number of samples per received symbol is M/N (samples/symbol) and the digital signal equalization tap coefficients of N series, and outputting the calculated equalization signal as the received symbol.

10. An optical reception method of demodulating an optical modulation signal into a baseband signal, which is an electrical signal, and decoding a received symbol acquired by converting the baseband signal, the optical reception method comprising:

converting the baseband signal into a digital signal of which the number of samples per received symbol is M/N (samples/symbol), M and N being positive integers, M/N being not an integer, and "M>N" being satisfied; and executing an equalization operation set in advance to output the received symbol on a basis of the digital signal of which the number of samples per received symbol is M/N (samples/symbol) and at least one tap coefficient used for equalization of a signal, the at least one tap coefficient being updated in any sampling period, wherein the at least one tap coefficient includes a digital signal equalization tap coefficient, and wherein the executing step comprises
calculating an equalization signal of 1 (samples/symbol) by executing the equalization operation on a basis of the digital signal of which the number of samples per received symbol is M/N (samples/symbol), the digital signal equalization tap coefficient, and a phase shift tap coefficient of N series set in advance, and outputting the calculated equalization signal as the received symbol.

11. An optical communication system comprising:
an optical transmitter that transmits an optical modulation signal; and
an optical receiver that receives the optical modulation signal, demodulates the optical modulation signal into a baseband signal that is an electrical signal, and decodes a received symbol acquired by converting the baseband signal, wherein the optical receiver includes:
an analog-to-digital converter that converts the baseband signal into a digital signal of which the number of samples per received symbol is M/N (samples/symbol), M and N being positive integers, M/N being not an integer, and "M>N" being satisfied; and an adaptive equalization processing unit that executes an equalization operation set in advance to output the received symbol on a basis of the digital signal of which the number of samples per received symbol is M/N (samples/symbol) and at least one tap coefficient used for equalization of a signal, the at least one tap coefficient being updated in any sampling period, wherein the at least one tap coefficient includes digital signal equalization tap coefficients, and wherein the adaptive equalization processing unit includes:
an adaptive equalizer that calculates an equalization signal of 1 (samples/symbol) by executing the equalization operation on a basis of the digital signal of which the number of samples per received symbol is M/N (samples/symbol) and the digital signal equalization tap coefficients of N series and outputs the calculated equalization signal as the received symbol.

12. An optical communication system comprising:
an optical transmitter that transmits an optical modulation signal; and
an optical receiver that receives the optical modulation signal, demodulates the optical modulation signal into a baseband signal that is an electrical signal, and decodes a received symbol acquired by converting the baseband signal, wherein the optical receiver includes:
an analog-to-digital converter that converts the baseband signal into a digital signal of which the number of samples per received symbol is M/N (samples/symbol), M and N being positive integers, M/N being not an integer, and "M>N" being satisfied; and an adaptive equalization processing unit that executes an equalization operation set in advance to output the received symbol on a basis of the digital signal of which the number of samples per received symbol is M/N (samples/symbol) and at least one tap coefficient used for equalization of a signal, the at least one tap coefficient being updated in any sampling period, wherein the at least one tap coefficient includes a digital signal equalization tap coefficient, and wherein the adaptive equalization processing unit includes
an adaptive equalizer that calculates an equalization signal of 1 (samples/symbol) by executing the equalization operation on a basis of the digital signal of which the number of samples per received symbol is M/N (samples/symbol), the digital signal equalization tap coefficient, and a phase shift tap coefficient of N series set in advance and outputs the calculated equalization signal as the received symbol.

13. The optical receiver according to claim 1, wherein the at least one tap coefficient is updated every K×M sampling periods, K being a positive integer.

14. The optical receiver according to claim 3, wherein the at least one tap coefficient is updated every K×M sampling periods, K being a positive integer.

* * * * *